United States Patent
Eckart et al.

(10) Patent No.: US 11,869,149 B2
(45) Date of Patent: Jan. 9, 2024

(54) COMPUTER-BASED TECHNIQUES FOR LEARNING COMPOSITIONAL REPRESENTATIONS OF 3D POINT CLOUDS

(71) Applicant: NVIDIA CORPORATION, Santa Clara, CA (US)

(72) Inventors: Ben Eckart, Oakland, CA (US); Christopher Choy, Los Angeles, CA (US); Chao Liu, Pittsburgh, PA (US); Yurong You, Ithaca, NY (US)

(73) Assignee: NVIDIA Corporation, Santa Clara, CA (US)

( * ) Notice: Subject to any disclaimer, the term of this patent is extended or adjusted under 35 U.S.C. 154(b) by 48 days.

(21) Appl. No.: 17/744,467

(22) Filed: May 13, 2022

(65) Prior Publication Data
US 2023/0368468 A1    Nov. 16, 2023

(51) Int. Cl.
*G06T 17/10* (2006.01)
*G06T 19/20* (2011.01)
*G06N 3/084* (2023.01)
*G06N 3/045* (2023.01)

(52) U.S. Cl.
CPC ............. *G06T 17/10* (2013.01); *G06N 3/045* (2023.01); *G06N 3/084* (2013.01); *G06T 19/20* (2013.01); *G06T 2219/2016* (2013.01)

(58) Field of Classification Search
CPC . G06T 17/10; G06T 19/20; G06T 2219/2016; G06N 3/045; G06N 3/084
See application file for complete search history.

(56) References Cited

U.S. PATENT DOCUMENTS

| | | | |
|---|---|---|---|
| 2018/0322623 A1* | 11/2018 | Memo | G06N 3/084 |
| 2022/0261593 A1* | 8/2022 | Yu | G06N 3/088 |
| 2022/0414974 A1* | 12/2022 | Zakharov | G06T 7/70 |
| 2023/0135659 A1* | 5/2023 | Wu | G06Q 40/06 706/21 |
| 2023/0145535 A1* | 5/2023 | Hatamizadeh | G06N 3/02 514/460 |

(Continued)

OTHER PUBLICATIONS

Burgess et al., "MONet: Unsupervised Scene Decomposition and Representation", arXiv:1901.11390, Jan. 22, 2019, 22 pages.

(Continued)

*Primary Examiner* — Motilewa Good-Johnson
(74) *Attorney, Agent, or Firm* — Artegis Law Group, LLP

(57) ABSTRACT

In various embodiments, an unsupervised training application executes a neural network on a first point cloud to generate keys and values. The unsupervised training application generates output vectors based on a first query set, the keys, and the values and then computes spatial features based on the output vectors. The unsupervised training application computes quantized context features based on the output vectors and a first set of codes representing a first set of 3D geometry blocks. The unsupervised training application modifies the first neural network based on a likelihood of reconstructing the first point cloud, the quantized context features, and the spatial features to generate an updated neural network. A trained machine learning model includes the updated neural network, a second query set, and a second set of codes representing a second set of 3D geometry blocks and maps a point cloud to a representation of 3D geometry instances.

20 Claims, 7 Drawing Sheets

(56) References Cited

U.S. PATENT DOCUMENTS

2023/0147722 A1* 5/2023 Ramirez De Chanlatte ............... G06T 7/50
345/419

OTHER PUBLICATIONS

Carion et al., "End-to-End Object Detection with Transformers", arXiv:2005.12872, In ECCV, May 28, 2020, 26 pages.
Chang et al., "ShapeNet: An Information-Rich 3D Model Repository", arXiv:1512.03012, Dec. 9, 2015, 11 pages.
Chen et al., "3D Object Proposals for Accurate Object Class Detection", In Advances in Neural Information Processing Systems, 2015, 9 pages.
Choy et al., "4D Spatio-Temporal ConvNets: Minkowski Convolutional Neural Networks", In CVPR, 2019, pp. 3075-3084.
Dai et al., "ScanNet: Richly-annotated 3D Reconstructions of Indoor Scenes", In CVPR, 2017, pp. 5828-5839.
Deng et al., "ImageNet: A Large-Scale Hierarchical Image Database", In CVPR, IEEE, 2009, pp. 248-255.
Dinh et al., "Density Estimation Using Real NVP", In ICLR, arXiv:1605.08803, 2017, 32 pages.
Dumoulin et al., "Feature-Wise Transformations", Retrieved from https://distill.pub/2018/featurewise-transformations, Distill, 2018, 23 pages.
Eckart et al., "Self-Supervised Learning on 3D Point Clouds by Learning Discrete Generative Models", In Proceedings of the IEEE/CVF Conference on Computer Vision and Pattern Recognition (CVPR), Jun. 2021, pp. 8248-8257.
Geiger et al., "Are we ready for Autonomous Driving?, The KITTI Vision Benchmark Suite", In CVPR, IEEE, 2012, pp. 3354-3361.
Genova et al., "Local Deep Implicit Functions for 3D Shape", In Proceedings of the IEEE/CVF Conference on Computer Vision and Pattern Recognition, 2020, pp. 4857-4866.
Genova et al., "Learning Shape Templates with Structured Implicit Functions" In Proceedings of the IEEE/CVF International Conference on Computer Vision, 2019, pp. 7154-7164.
Greff et al., "Multi-Object Representation Learning with Iterative Variational Inference", Proceedings of the 36th International Conference on Machine Learning, PMLR 97, 2019, 10 pages.
Hou et al., "Exploring Data-Efficient 3D Scene Understanding with Contrastive Scene Contexts", In Proceedings of the IEEE/CVF Conference on Computer Vision and Pattern Recognition, 2021, pp. 15587-15597.
Kingma et al., "Auto-Encoding Variational Bayes", arXiv:1312.6114, 2013, 14 pages.
Klokov et al., "Discrete Point Flow Networks for Efficient Point Cloud Generation", In Computer Vision—ECCV 2020: 16th European Conference, arXiv:2007.10170, Aug. 23-28, 2020, 30 pages.
Locatello et al., "Object-Centric Learning with Slot Attention", 34th Conference on Neural Information Processing Systems, 2020, 14 pages.
MÜLLER et al., "Neural Importance Sampling", ACM Transactions on Graphics, arXiv:1808.03856, vol. 38, No. 5, Sep. 3, 2019, pp. 145:1-145:19.
Perez et al., "FiLM: Visual Reasoning with a General Conditioning Layer", In Proceedings of the AAAI Conference on Artificial Intelligence, vol. 32, 2018, pp. 3942-3951.
Postels et al., "Go with the Flows: Mixtures of Normalizing Flows for Point Cloud Generation and Reconstruction", arXiv:2106.03135, Nov. 29, 2021, 22 pages.
Poursaeed et al., "Self-Supervised Learning of Point Clouds via Orientation Estimation", In 2020 International Conference on 3D Vision (3DV), arXiv:2008.00305, IEEE, 2020, 11 pages.
Qi et al., "PointNet++: Deep Hierarchical Feature Learning on Point Sets in a Metric Space", 31st Conference on Neural Information Processing Systems, 2017, 10 pages.
Ramesh et al., "Zero-Shot Text-to-Image Generation", Proceedings of the 37 th International Conference on Machine Learning, PMLR 139, 2020, 11 pages.
Rao et al., "Global-Local Bidirectional Reasoning for Unsupervised Representation Learning of 3D Point Clouds", In Proceedings of the IEEE/CVF Conference on Computer Vision and Pattern Recognition, 2020, pp. 5376-5385.
Razavi et al., "Generating Diverse High-Fidelity Images with VQ-VAE-2", 33rd Conference on Neural Information Processing Systems, 2019, pp. 14866-14876.
Rezende et al., "Variational Inference with Normalizing Flows", Proceedings of the 32nd International Conference on Machine Learning, vol. 37, 2015, 9 pages.
Rezende et al., "Stochastic Backpropagation and Approximate Inference in Deep Generative Models", Proceedings of the 31st International Conference on Machine Learning, vol. 32, 2014, 9 pages.
Ronneberger et al., "U-Net: Convolutional Networks for Biomedical Image Segmentation", DOI: 10.1007/978-3-319-24574-4_28, In International Conference on Medical image computing and computer-assisted Intervention, 2015, pp. 234-241.
Sauder et al., "Self-Supervised Deep Learning on Point Clouds by Reconstructing Space", 33rd Conference on Neural Information Processing Systems, 2019, 11 pages.
Shi et al., "PointRCNN: 3D Object Proposal Generation and Detection from Point Cloud", In Proceedings of the IEEE/CVF conference on computer vision and pattern recognition, 2019, pp. 770-779.
Stelzner et al., "Decomposing 3D Scenes into Objects via Unsupervised Volume Segmentation", arXiv:2104.01148, 2021, 15 pages.
Van Den Oord et al., "Neural Discrete Representation Learning", 31st Conference on Neural Information Processing Systems, 2017, 10 pages.
Vaswani et al., "Attention Is All You Need", 31st Conference on Neural Information Processing Systems, 2017, 11 pages.
Xie et al., "PointContrast: Unsupervised Pre-training for 3D Point Cloud Understanding", In ECCV, Springer, arXiv:2007.10985, 2020, 24 pages.
Yang et al., "PointFlow: 3D Point Cloud Generation with Continuous Normalizing Flows", In Proceedings of the IEEE/CVF International Conference on Computer Vision, 2019, pp. 4541-4550.
Zhang et al., "Self-Supervised Pretraining of 3D Features on any Point-Cloud", arXiv:2101.02691, 2021, pp. 10252-10263.
Zhou et al., "On the Continuity of Rotation Representations in Neural Networks", In Proceedings of the IEEE/CVF Conference on Computer Vision and Pattern Recognition, 2019, pp. 5745-5753.

* cited by examiner

COMPUTER-BASED TECHNIQUES FOR LEARNING COMPOSITIONAL REPRESENTATIONS OF 3D POINT CLOUDS

BACKGROUND

Field of the Various Embodiments

The various embodiments relate generally to computer science and artificial intelligence and machine learning and, more specifically, to computer-based techniques for learning compositional representations of three dimensional ("3D") point clouds.

DESCRIPTION OF THE RELATED ART

Certain types of sensors are able to sample three-dimensional (3D) data points or "points" around the surfaces of objects in 3D scenes to generate point clouds that represent the 3D scenes. The resulting "scene point clouds" typically are unordered sets of points that are distributed in space in an unstructured and irregular fashion. For example, a light detection and ranging (LiDAR) sensor mounted on an autonomous vehicle could output a scene point cloud that includes irregularly distributed points sampled around the surfaces of other vehicles, pedestrians, and/or traffic poles.

One particular challenge associated with scene point clouds is that processing unstructured and/or unordered data using machine learning (ML) models can be quite difficult. In that regard, many types of ML models are trained to recognize meaningful patterns in structured and ordered data and then make decisions based on those patterns in order to perform specific tasks. These types of "task-specific" ML models usually are unable to process unstructured input data and usually generate inconsistent results when processing different orderings of the same underlying input data. To enable task-specific ML models to indirectly operate on unstructured and/or unordered input data, other ML models can be trained to generate structured representations of input data that are insensitive to how the input data is ordered as well as to other unimportant variations in the input data.

In one approach to generating structured representations of scene point clouds, an ML model is trained to map a scene point cloud to a predetermined number of numerical features that describe a single object in a canonical pose. The ML model is usually invariant to the ordering of the inputs to the ML model or "permutation-invariant." Therefore, the resulting trained ML model consistently maps different orderings of the same set of points to the same numerical features in the same order. One drawback of this approach, however, is that the trained ML model is not capable of processing a point cloud representing a 3D scene that includes either a single object in a non-canonical pose or multiple objects to generate numerical features that accurately represent the 3D scene. Because real-world 3D scenes normally include multiple objects in various poses, the trained ML model can be used to process only a small subset of scene point clouds reliably.

As the foregoing illustrates, what is needed in the art are more effective techniques for generating structured representations of scene point clouds.

SUMMARY

One embodiment of the present invention sets forth a computer-implemented method for training a machine learning model to generate representations of point clouds. The method includes executing a first neural network on a first point cloud that represents a first three-dimensional (3D) scene to generate a key set and a value set; generating an output vector set based on a first query set, the key set, and the value set; computing a set of spatial features based on the output vector set; computing a set of quantized context features based on the output vector set and a first set of codes representing a first set of 3D geometry blocks; and modifying the first neural network based on a likelihood of reconstructing the first point cloud, the set of quantized context features, and the set of spatial features to generate an updated neural network, where a trained machine learning model includes the updated neural network, a second query set, and a second set of codes representing a second set of 3D geometry blocks and maps a point cloud representing a 3D scene to a representation of a set of 3D geometry instances.

At least one technical advantage of the disclosed techniques relative to the prior art is that the disclosed techniques enable point clouds that represent real-world 3D scenes to be processed effectively using ML models that, normally, are not able to operate on unstructured and/or unordered input data. In that regard, an ML model is trained to decompose a 3D scene, represented by a point cloud, into a set of 3D geometry blocks and associated spatial data that are specified via numerical features. Because a permutation-invariant neural network included in the ML model ingests points from the point cloud, the resulting trained ML model consistently maps different orderings of the same set of points to the same 3D geometry blocks and the same spatial data specified via the same numerical features in the same order. Consequently, an ML model trained using the disclosed techniques can map point clouds representing 3D scenes that include any number of objects in any poses to structured and ordered features that can be processed efficiently by a wide range of other ML models. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are denoted with reference numbers identifying the object and parenthetical alphanumeric character(s) identifying the instance where needed.

System Overview

Figure 1:
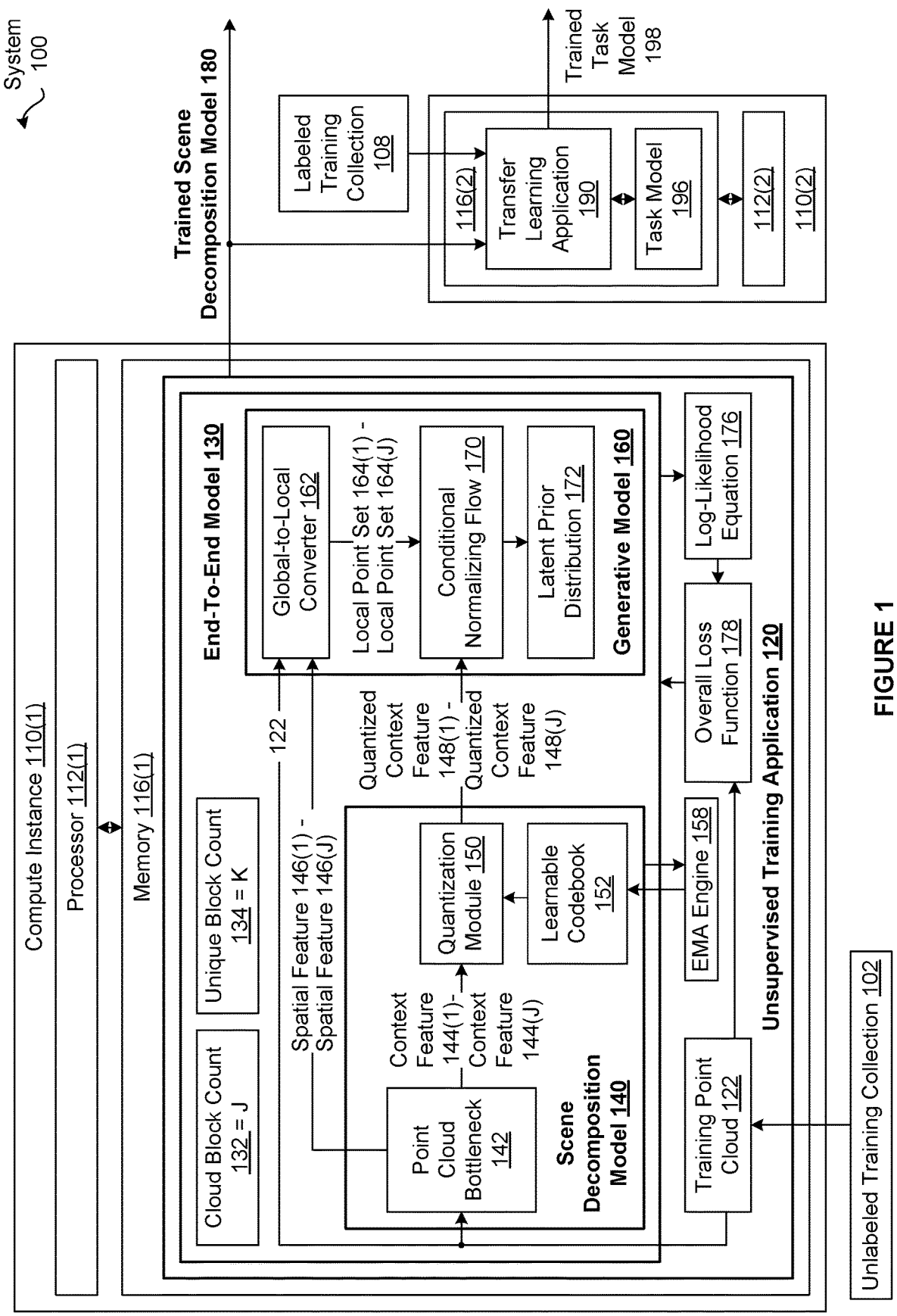
FIG. 1 is a conceptual illustration of a system configured to implement one or more aspects of the various embodiments.

FIG. 1 is a conceptual illustration of a system 100 configured to implement one or more aspects of the various embodiments. As shown, in some embodiments, the system 100 includes, without limitation, a compute instance 110(1), a compute instance 110(2), an unlabeled training collection 102, and a labeled training collection 108. In some other embodiments, the compute instance 110(2), the unlabeled training collection 102, the labeled training collection 108, or any combination thereof can be omitted from the system 100. In the same or other embodiments, the system 100 can include, without limitation, any number of other compute instances. In some embodiments, the components of the system 100 can be distributed across any number of shared geographic locations and/or any number of different geographic locations and/or implemented in one or more cloud computing environments (i.e., encapsulated shared resources, software, data, etc.) in any combination.

As shown, the compute instance 110(1) includes, without limitation, a processor 112(1) and a memory 116(1), and the compute instance 110(2) includes, without limitation, a processor 112(2) and a memory 116(2). For explanatory purposes, the compute instance 110(1) and the compute instance 110(2) are also referred to herein individually as "the compute instance 110" and collectively as "the compute instances 110." The processor 112(1) and the processor 112(2) are also referred to herein individually as "the processor 112" and collectively as "the processors 112." The memory 116(1) and the memory 116(2) are also referred to herein individually as "the memory 116" and collectively as "the memories 116." Each of the compute instances 110 can be implemented in a cloud computing environment, implemented as part of any other distributed computing environment, or implemented in a stand-alone fashion.

The processor 112 can be any instruction execution system, apparatus, or device capable of executing instructions. For example, the processor 112 could be a central processing unit, a graphics processing unit, a controller, a microcontroller, a state machine, or any combination thereof. The memory 116 of the compute instance 110 stores content, such as software applications and data, for use by the processor 112 of the compute instance 110. The memory 116 can be one or more of a readily available memory, such as random-access memory, read-only memory, floppy disk, hard disk, or any other form of digital storage, local or remote.

In some other embodiments, each compute instance 110 can include any number of processors 112 and any number of memories 116 in any combination. In particular, any number of compute instances 110 (including one) and/or any number of other compute instances can provide a multiprocessing environment in any technically feasible fashion.

In some embodiments, a storage (not shown) may supplement or replace the memory 116 of the compute instance 110. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing In general, each compute instance 110 is configured to implement one or more software applications. For explanatory purposes only, each software application is described as residing in the memory 116 of a single compute instance (e.g., the compute instance 110(1) or the compute instance 110(2)) and executing on the processor 112 of the single compute instances. In some embodiments, any number of instances of any number of software applications can reside in the memory 116 and any number of other memories associated with any number of other compute instances and execute on the processor 112 of the compute instance 110 and any number of other processors associated with any number of other compute instances in any combination. In the same or other embodiments, the functionality of any number of software applications can be distributed across any number of other software applications that reside in the memory 116 and any number of other memories associated with any number of other compute instances and execute on the processor 112 and any number of other processors associated with any number of other compute instances in any combination. Further, subsets of the functionality of multiple software applications can be consolidated into a single software application.

In some embodiments, the compute instance 110(1) is configured to train an ML model to generate structured and ordered representations of scene point clouds. In the same or other embodiments, a scene point cloud includes, without limitation, any number of points that collectively correspond to any portions (including all) of any number and/or types of objects in a 3D scene. Each point includes, without limitation, a 3D position and optionally any number and/or types of additional attributes associated with the 3D scene (e.g., a surface normal). In some embodiments, the 3D position of each point in a scene point cloud is specified via 3D coordinates in a "global" coordinate system that is associated with the point cloud. The points in a typical scene point cloud are unordered and often distributed in a space in an unstructured and often irregular fashion. For explanatory purposes, a set of points sampled from a scene point cloud is also referred to herein as a scene point cloud.

As described previously here, in a conventional approach to generating structured representations of scene point clouds, a conventional ML model is trained to map a scene point cloud to a predetermined number of numerical features that describe a single object in a canonical pose. One drawback of such an approach is that the resulting trained conventional ML model is not capable of processing a point cloud representing a 3D scene that includes either a single object in a non-canonical pose or multiple objects to generate numerical features that accurately represent the 3D scene. Because real-world 3D scenes normally include multiple objects in various poses, the trained conventional ML model can be used to process only a small subset of point clouds representing real-world 3D scenes reliably.

Recreating Different 3D Scenes Using One Set of 3D Geometry Blocks

To address the above problems, in some embodiments, the compute instance 110 includes, without limitation, an unsupervised training application 120 that trains a scene decomposition model 140 to map scene point clouds to features corresponding to a set of 3D geometry blocks and associated spatial data. In some embodiments, each 3D geometry block can represent any portion (including all) of any object. In the same or other embodiments, the spatial data for a 3D geometry block represents the position, orientation, and scale of an instance of the 3D geometry block. An instance of a 3D geometry block is also referred to herein as a "3D geometry instance." In some embodiments, the features generated by the scene decomposition model 140 are structured and ordered. In the same or other embodiments, each feature generated by the scene decomposition model 140 is a set of one or more numerical values and is also commonly referred to as a "feature vector."

In some embodiments, the set of 3D geometry blocks specifies, without limitation, J 3D geometry blocks where J is a positive integer and the J 3D geometry blocks are not necessarily unique. The value of J can be determined and/or dynamically updated in any technically feasible fashion. In some embodiments, J is the value of a cloud block count 132 that is a hyperparameter associated with the scene decomposition model 140. Accordingly, in some embodiments, the scene decomposition model 140 decomposes a 3D scene represented by a point cloud into a total of J 3D geometry instances.

For example, suppose that the cloud block count 132 was forty. If a point cloud represented a single bunny, then the scene decomposition model 140 in some embodiments could decompose the single bunny into forty 3D geometry instances. By contrast, if a point cloud represented two bunnies and a tree, then the scene decomposition model 140 in the same or other embodiments could decompose each bunny into ten 3D geometry pieces and the tree into twenty 3D geometry pieces.

In some embodiments, each of the 3D geometry blocks is an instance of one of K unique 3D geometry blocks, where K is a positive integer. The value of K can be determined and/or dynamically updated in any technically feasible fashion. In the same or other embodiments, K is the value of a unique block count 134 that is a hyperparameter associated with the scene decomposition model 140. Accordingly, in some embodiments, the scene decomposition model 140 decomposes a 3D scene represented by a point cloud into a total of J instances of 3D geometry blocks, where each of the J 3D geometry blocks corresponds to one of the K unique 3D geometry blocks.

For example, suppose that the cloud block count 132 was three, the unique block count 134 was four, and the four unique 3D geometry blocks visually represented a bunny, a tree, an owl, and a fox. If a point cloud represented three bunnies, then the scene decomposition model 140 in some embodiments could decompose the point cloud into three instances of the 3D geometry block representing the bunny. By contrast, if a point cloud represented two instances of a bunny and a tree, then the scene decomposition model 140 in the same or other embodiments could decompose the point cloud into two instances of the 3D geometry block representing the bunny and one instance of the 3D geometry block representing the tree. And if a point cloud represented a tree, an owl, and a fox, then the scene decomposition model 140 in some embodiments could decompose the point cloud into a single instance of each of the 3D geometry blocks representing the tree, the owl, and the fox.

Figure 2:
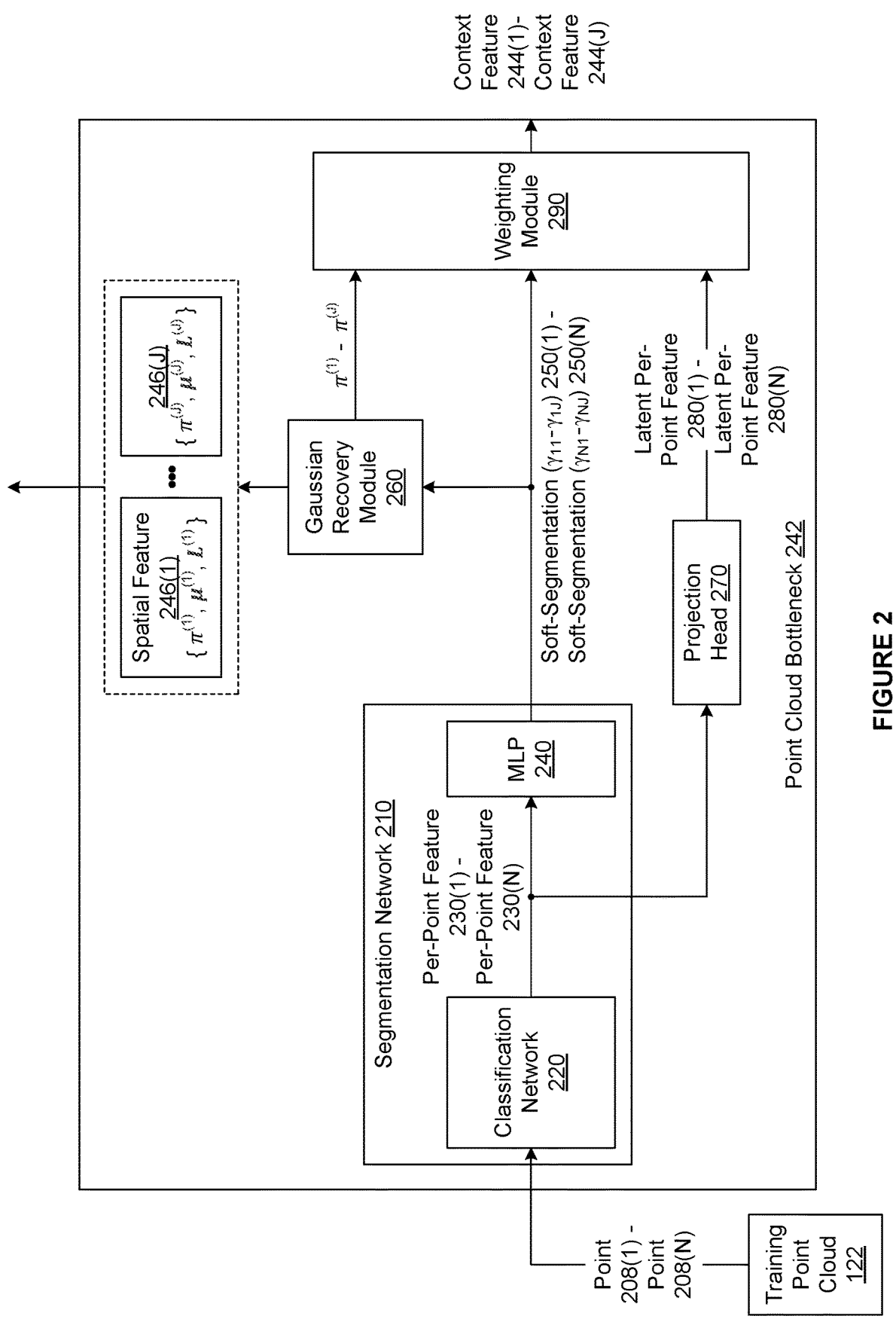
FIG. 2 is a more detailed illustration of the point cloud bottleneck of FIG. 1, according to various embodiments.

In some embodiments, at any given time, each of the K unique 3D geometry blocks associated with the scene decomposition model 140 corresponds to a different learnable code in a learnable codebook 152. The learnable codebook 152 includes, without limitation, K different learnable codes (not shown). Each learnable code is a different learnable variable associated with the scene decomposition model 140. As depicted in FIG. 2, in some embodiments, the learnable codebook 152 is included in the scene decomposition model 140. In some other embodiments, the learnable codebook 152 and/or the K learnable codes can be associated with the scene decomposition model 140 in any other technically feasible fashion.

As described in greater detail below, while training the scene decomposition model, the unsupervised training application 120 can modify the K learnable codes to optimize the corresponding K unique 3D geometry blocks. Accordingly, the learnable codebook 152, the K learnable codes, and the K 3D geometry blocks corresponding to the K learnable codes can vary during training. The K learnable codes are also referred to herein individually as a "code" and collectively as "codes." The learnable codebook 152 is also referred to herein as a "set of codes" and a "set of codes representing a set of 3D geometry blocks."

As shown, in some embodiments, the unsupervised training application 120 resides in the memory 116(1) of the compute instance 110(1) and executes on the processor of the compute instance 110(1). In the same or other embodiments, the unsupervised training application 120 includes, without limitation, an end-to-end model 130, a training point cloud 122, a log-likelihood equation 176, an overall loss function 178, and an exponential moving average (EMA) engine 158. In some other embodiments, the unsupervised training application 120 and the end-to-end model 130 are implemented as separate components of the system 100.

As shown, in some embodiments, the end-to-end model 130 includes, without limitation, the scene decomposition model 140, the cloud block count 132, the unique block count 134, and a generative model 160. As described in greater detail below, in the same or other embodiments, the unsupervised training application 120 executes any number and/or types of unsupervised machine learning operations and/or algorithms on the end-to-end model 130 based on the unlabeled training collection 102 to train the scene decomposition model 140.

The unlabeled training collection 102 includes, without limitation, any number of scene point clouds. Each of the scene point clouds included in the unlabeled training collection 102 can be an unlabeled scene point cloud or a labeled scene point cloud. As referred to herein, an "unlabeled scene point cloud" is any scene point cloud that is not associated with any supervised ML labels. By contrast, a "labeled scene point cloud" is any scene point cloud that is associated with one or more supervised ML labels. A "supervised ML label" can be any amount and/or types of data that facilitates one or more supervised ML operations. In some embodiments, the unsupervised training application 120 disregards any supervised ML labels associated with any scene point clouds included in the unlabeled training collection 102. For explanatory purposes, the 3D scenes represented by the scene point clouds included in the unlabeled training collection 102 are collectively referred to herein as "the 3D scenes represented by the unlabeled training collection 102."

The scene decomposition model 140 can be any ML model that includes, without limitation, any number and/or types of learnable variables and has inductive biases that enable the ML model to learn commonly appearing 3D geometry blocks and how to spatially scale and place instances of the 3D geometry blocks to recreate 3D scenes represented by point clouds. In some embodiments, to decompose a 3D scene, the scene decomposition model 140 recreates the 3D scene using J 3D geometry instances, where each 3D geometry instance is an instance of one of K 3D geometry blocks. As described previously herein, in some embodiments J and K are specified by the cloud block count 132 and the unique block count 134, respectively. In the same or other embodiments, each of the K 3D geometry blocks is represented by a different learnable code (not shown) included in the learnable codebook 152.

As persons skilled in the art will recognize, in addition to the values of J and K, the number and types of objects and portions of objects in the 3D scenes represented by the unlabeled training collection 102 influence the unique 3D geometry blocks that the scene decomposition model 140 learns. In some embodiments, the scene decomposition model 140 learns K unique 3D geometry blocks that individually and collectively reflect commonalities and variations, respectively, in and across the 3D scenes represented by the unlabeled training collection 102. For instance, in some embodiments, because the scene decomposition model 140 recreates each 3D scene using J 3D geometry instances based on a single set of K 3D geometry blocks, the scene decomposition model 140 learns at least some "common" 3D geometry blocks. Each common 3D geometry block can be optionally translated, rotated, scaled, or any combination thereof to at least approximately match multiple portions of any number of the 3D scenes represented by the unlabeled training collection 102.

For example, if J was two, K was three, and the unlabeled training collection 102 represented five hundred 3D scenes that each included two dogs, two cats, or two bunnies, then the scene decomposition model 140 could learn to recreate each of the 3D scenes using two instances of a "dog" geometry object, a "cat" geometry object, or a "bunny" geometry object. If J was thirty, K was twenty, and the unlabeled training collection 102 represented five hundred 3D scenes clouds that each represented a different car, then the scene decomposition model 140 could learn to recreate each car using thirty instances of twenty relatively simple 3D geometry blocks that collectively captured the variations in the 3D structures of the cars. Some examples of relatively simple 3D geometry blocks include, without limitation, a disc shape, a cylinder shape, a rectangle shape, and a triangle shape.

As shown, in some embodiments, the scene decomposition model 140 maps a scene point cloud to a spatial feature 146(1)-a spatial feature 146(J) and a quantized context feature 148(1)-a quantized context feature 148(J). For explanatory purposes, a scene point cloud that is inputted into the scene decomposition model 140 is denoted herein as P and is a set of points denoted herein as $\{p_1, p_2, \ldots, p_N\}$, where N is an integer that denotes the total number of points in $\mathcal{P}$. In some embodiments, N can vary across any number of point clouds that are inputted into the scene decomposition model 140.

For explanatory purposes, the spatial feature 146(1)-the spatial feature 146(J) are also referred to herein individually as a "spatial feature 146" and collectively as "spatial features 146" and "spatial features 146(1)-146(J)." The quantized context feature 148(1)-the quantized context feature 148(J) are also referred to herein individually as a "quantized context feature 148" and collectively as "quantized context features 148" and "quantized context features 148(1)-148(J)." Together, the spatial features 146 and the quantized context features 148 represent a decomposition of the 3D scene represented by the point cloud P into J 3D geometry instances based on K unique 3D geometry blocks. As shown, in some embodiments, the scene decomposition model 140 includes, without limitation, a point cloud bottleneck 142, a quantization module 150, and the learnable codebook 152.

The point cloud bottleneck 142 maps the scene point cloud P to a context feature 144(1)-a context feature 144(J) and the spatial feature 146(1)-the spatial feature 146(J). For explanatory purposes, the context feature 144(1)-the context feature 144(J) are also referred to herein individually as a "context feature 144" and collectively as "context features 144" and context features 144(1)-144(J)." In some embodiments, for an integer i from 1 through N, the point cloud bottleneck 142 sets a latent variable denoted herein as $d_i$ equal to an index corresponding to the 3D geometric instance that the scene decomposition model 140 predicts is most likely to include the point $p_i$.

In some embodiments, for an integer j from 1 through J, the spatial feature 146(j) represents any amount and/or types of spatial data associated with an instance of a 3D geometry block represented by the context feature 144(j). In the same or other embodiments, each of the spatial features 146 is a different set of one or more values for a set of one or more spatial characteristics that can describe any amount and/or types of spatial information in any technically feasible fashion.

The point cloud bottleneck 142 can be any type of ML model that can learn to decompose a 3D scene represented by a point cloud into instances of 3D geometry blocks in any technically feasible fashion. The point cloud bottleneck 142 includes, without limitation, any number and/or types of learnable variables. In some embodiments, each of the learnable variables in the point cloud bottleneck 142 is a different learnable weight.

As described in greater detail below in conjunction with FIG. 2, in some embodiments, the point cloud bottleneck 142 is based on a segmentation network. In the same or other embodiments, the spatial feature 146(j), where j is any integer from 1 through J, specifies a weight, a mean, and a lower triangular Cholesky decomposed covariance of $j^{th}$ 3D Gaussian in a mixture of J 3D Gaussians and is denoted herein as $\{\pi^{(j)}, \mu^{(j)}, L^{(j)}\}$. In some embodiments, a positive-definite covariance is uniquely broken down using Cholesky decomposition into a lower triangular matrix that, for explanatory purposes, is also referred to herein as a "lower triangular Cholesky decomposed covariance." In the same or other embodiments a positive-definite covariance is broken down using singular value decomposition (SVD) into a 3D scaling factor and a rotation matrix (an orthonormal matrix).

As described in greater detail below in conjunction with FIG. 4, in some embodiments, the point cloud bottleneck 142 is based on a transformer decoder. In the same or other embodiments, the spatial feature 146(j), specifies values corresponding to a normalized mixture weight, a rotation matrix, a 3D scaling factor, and a translation for a different cluster of points within the training point cloud 122 and is denoted herein as $\{\pi^{(j)}, R^{(j)}, s^{(j)}, \mu^{(j)}\}$. In some embodiments, a matrix that is isomorphic to the lower triangular Cholesky decomposed covariance described previously herein and, for explanatory purposes, is also denoted herein as $L^{(j)}$ is equal to $R^{(j)}s^{(j)}$.

As shown, the quantization module 150 maps the context features 144(1)-144(J) to the nearest learnable codes in the learnable codebook 152 to generate quantized context features 148(1)-148(J), respectively. In some embodiments, each of the context features 144, the learnable codes, and the quantized context features 148 is a set of one or more values. The context features 144(1)-144(J) are denoted herein as $g^{(1)}$-$g^{(J)}$, respectively. The set of K learnable codes in the learnable codebook 152 is denoted herein as $\{e_1, e_2, e_K<\}$. And the quantized context features 148(1)-148(J) are denoted herein as $e^{(1)}$-$e^{(J)}$, respectively The quantization module 150 can map the context features 144(1)-144(J) to the quantized context features 148(1)-148(J), respectively, in any technically feasible fashion. In some embodiments, the quantization module 150 computes distances between the context features 144 and the learnable codes included in the learnable codebook 152 in any technically feasible fashion. For an integer j from 1 through J, he quantization module 150 then sets the quantized context feature 148(j) equal to the learnable code that is nearest to the context feature 144(j) as per the distances. For instance, in some embodiments, the quantization module 150 maps the context feature 144(j), where j is any integer from 1 through J, to quantized context feature 148(j) using equation (1):

$$e^{(j)} = \arg \min_k \|e^{(k)} - g^{(j)}\|^2 \quad (1)$$

Notably, in some embodiments, the quantization module 150 enforces a discrete bottleneck for the context features 144 based on the learnable codebook 152 while the scene decomposition model 140 learns the learnable codebook 152. As described in greater detail below, in some embodiments, the EMA engine 158 iteratively updates each learnable code in the learnable codebook 152 based on an exponential moving average of a subset of the context features 144 that are nearest to the learnable code.

The generative model 160 can be any type of model that can model and/or be used to evaluate any type of likelihood associated with reconstructing the training point cloud 122 based on the quantized context features 148 and the spatial features 146 in any technically feasible fashion. In some embodiments, the generative model 160 can be any type of model that enables computation of a log-likelihood for reconstruction of the training point cloud 122 based on the quantized context features 148 and the spatial features 146.

More specifically, in some embodiments, the generative model 160 establishes the log-likelihood equation 176 that defines an exact log-likelihood for reconstruction of the training point cloud 122 based on the quantized context features 148 and the spatial features 146. As described in greater detail below, to train the scene decomposition model 140 included in the end-to-end model 130 in some embodiments, the unsupervised training application 120 maximizes the exact log-likelihoods or approximated log-likelihoods for reconstruction of any number of scene point clouds included in the unlabeled training collection 102.

For explanatory purposes, the generative model 160 in some embodiments is described below in the context of training point cloud 122 that the unsupervised training application 120 inputs into the end-to-end model 130 at any given point-in-time. Accordingly, the training point cloud 122 is denoted herein as $\mathcal{P}$, and the points in the training point cloud 122 are denoted herein as $p_{(1)}$-$p_{(N)}$, where N is the total number of points in the training point cloud 122. The training point cloud 122 can be any point cloud that represents a 3D scene.

As shown, in some embodiments, the unsupervised training application 120 inputs the training point cloud 122 into the end-to-end model 130 and, in response, the scene decomposition model 140 maps the training point cloud 122 to the quantized context features 148 and the spatial features 146. Subsequently, the unsupervised training application 120 or the end-to-end model 130 sets J variables of generative model 160 equal to the quantized context features 148. In this fashion, one or more variables of the generative model 160 are implicitly defined by the scene decomposition model 140. The unsupervised training application 120 or the end-to-end model 130 inputs the training point cloud 122 and the spatial features 146 into the scene decomposition model 140.

As shown, in some embodiments, the generative model 160 includes, without limitation, a global-to-local converter 162, a conditional normalizing flow 170, and a latent prior distribution 172. In some embodiments, the global-to-local converter 162 generates the local point set 164(1)-the local point set 164(J) based on the spatial features 146(1)-146(J), respectively, and the training point cloud 122. For explanatory purposes, the local point set 164(1)-the local point set 164(J) are also referred to herein individually as a "local point set 164" and collectively as "local point sets 164" and "local point sets 164(1)-164(J)."

The local point sets 164(1)-164(J) reflect coordinate frame of reference changes and 3D scaling factors that are associated with the spatial features 146(1)-146(J), respectively. The coordinate frame of reference changes associated with the spatial features 146 correspond to coordinate transformations from the 3D coordinate system associated with the training point cloud 122 to J different local coordinate systems. The local point sets 164(1)-164(J), denoted herein as $\mathcal{P}^{(1)}$-$\mathcal{P}^{(J)}$, respectively, are the sets of points denoted herein as $\{p_1^{(1)}, p_2^{(1)}, \ldots, p_N^{(1)}\}$-$\{p_1^{(J)}, p_2^{(J)}, \ldots, p_N^{(J)}\}$, respectively.

The global-to-local converter 162 can compute the local point sets 164 in any technically feasible fashion that is consistent with the spatial features 146 associated with the scene decomposition model 140. In some embodiments, the global-to-local converter 162 computes the points in the local point sets 164 based on the spatial features 146, the training point cloud 122, and one or more equations that reflect the set of spatial features associated with the scene decomposition model 140.

For instance, in some embodiments, $\mu^{(j)}$ and $L^{(j)}$ are included in the spatial feature 146(j), and the global-to-local converter 162 converts $p_i$ to $p_i^{(j)}$, where I is any integer from 1 to N and j is any integer from 1 to J, using equation (2).

$$p_i^{(j)} = (L^{(j)})^{-1}(p_i - \mu^{(j)}) \quad (2)$$

In some other embodiments, $\mu^{(j)}$, $R^{(j)}$, and $s^{(j)}$, $\mu^{(j)}$ are specified via the spatial feature 146(j), and the global-to-local converter 162 converts $p_i$ to $p_i^{(j)}$ using equation (3).

$$p_i^{(j)} = (R^{(j)}s^{(j)})^{-1}(p_i - \mu^{(j)}) \quad (3)$$

In some embodiments, the conditional normalizing flow 170 can be any invertible neural network that transforms a random variable from a data distribution to a latent prior distribution 172. In the same or other embodiments, the latent prior distribution 172 can be any data distribution that has a reduced complexity relative to the data distribution. In some embodiments, the latent prior distribution 172 is an isotropic Gaussian. In some other embodiments, the latent prior distribution 172 is a uniform, spherical lognormal distribution. In yet other embodiments, the latent prior distribution 172 is a spherical normal distribution. As persons skilled the art will recognize, because the conditional normalizing flow 170 is invertible, a one-to-one mapping between the latent prior distribution 172 and the data distribution enables derivation of an exact log-likelihood equation via the change of variables formula.

In some embodiments, the conditional normalizing flow 170 includes, without limitation, a normalizing flow (denoted $\phi^{-1}$) that is modulated by any number of feature-wise linear modulation (FILM) layers. In the same or other embodiments, the FILM layers influence the computations performed by the normalizing flow via a feature-wise affine transformation based on conditioning. For an integer j from 1 through J and an integer i from 1 through N, the normalizing flow modulated by the quantized context feature 148(j) warps the local coordinates of each point $p_i^{(j)}$ in the local point set 164(j) onto the latent prior distribution 172 to determine $z_i^{(j)}$ as per equation (4).

$$z_i^{(j)} = \phi^{-1}(p_i^{(j)}; e^{(j)}) \sim \mathcal{N}(0;I) \qquad (4)$$

As described previously herein, in some embodiments, a latent context variable $d_i$ specifies the 3D geometric instance that the scene decomposition model 140 predicts is most likely to include the point $p_i$. In the same or other embodiments and in accordance with equation (3), the probability density of $p_i$, given the latent context variable $d_i$, is denoted herein as "$P(p_i|d_i=j)$" and can be computed via equation (5) or equation (6).

$$P(p_i|d_i = j) = \left|\frac{\partial p_i^{(j)}}{\partial p_i}\right| \left|\det\frac{\partial \phi^{-1}}{\partial p_i^{(j)}}\right| \mathcal{N}(z_i^{(j)}; 0, I) \qquad (5)$$

$$P(p_i|d_i = j) = \frac{1}{|\det L^{(j)}|} \left|\det\frac{\partial \phi^{-1}}{\partial p_i^{(j)}}\right| \mathcal{N}(z_i^{(j)}; 0, I) \qquad (6)$$

The log-likelihood of reconstructing the training point cloud 122 based on a complete learned representation extracted from or computed using the scene decomposition model 140 is denoted herein as "log $P(\mathcal{P})$." In some embodiments, a complete learned representation of $\mathcal{P}$ includes, without limitation, the spatial features 146 and the quantized context features 148. In the same or other embodiments, an alternate complete representation of $\mathcal{P}$ includes, without limitation, the spatial features 146 and context features that the scene decomposition model 140 uses to determine the quantized context features 148. For explanatory purposes, a "complete learned representation of $\mathcal{P}$" is also referred to herein as a "representation of a point cloud" and "a representation of 3D geometry instances."

In some embodiments, the conditional normalizing flow 170, the end-to-end model 130, the unsupervised training application 120, or any combination thereof models log $P(\mathcal{P})$ as a mixture of normalizing flows. In accordance with modeling log $P(\mathcal{P})$ as a mixture of normalizing flows, in the same or other embodiments, the conditional normalizing flow 170, the end-to-end model 130, the unsupervised training application 120, or any combination thereof computes log $P(\mathcal{P})$ using one or more of equations (7)-(12).

$$\log P(\mathcal{P}) = \log \prod_{i=1}^{N} P(p_i) \qquad (7)$$

$$\log P(\mathcal{P}) = \log \prod_{i=1}^{N} \sum_{j=1}^{J} P(p_i|d_i = j)P(d_i = j) \qquad (8)$$

$$\log P(\mathcal{P}) = \log \prod_{i=1}^{N} \sum_{j=1}^{J} \pi^{(j)} P(p_i|d_i = j) \qquad (9)$$

$$\log P(\mathcal{P}) = \sum_{i=1}^{N} \log \sum_{j=1}^{J} \pi^{(j)} P(p_i|d_i = j) \qquad (10)$$

-continued $$\log P(\mathcal{P}) = \text{LogSumExp}_{j=1}^{J} \log \pi^{(j)} + \log P(p_i|d_i = j) \qquad (11)$$

$$\log P(\mathcal{P}) = \qquad (12)$$
$$\text{LogSumExp}_{j=1}^{J} \log \pi^{(j)} - \log|\det L^{(j)}| + \log\left|\det\frac{\partial \phi^{-1}}{\partial p_i^{(j)}}\right| + \log \mathcal{N}(z_i^{(j)}; 0, I)$$

In some embodiments, the log-likelihood equation 176 is equal to or equivalent to equation (12). As persons skilled in the art will recognize, the term "log |det $\partial \phi^{-1}/\partial p_i^{(j)}$|" that is included in the equation (12) is a log determinant of the normalizing flow $\phi^{-1}$ with respect to the point $p_i^{(j)}$. In some embodiments, to increase the efficiency of computing log P($\mathcal{P}$), one or more of the layers in the conditional normalizing flow 170 are not only designed for invertibility but are also designed to facilitate tractable computation of the log determinant Jacobians of the normalizing flow $\phi^{-1}$ with respect to any number (including all) of the points in the local point sets 164.

In some embodiments, prior to training the end-to-end model 130, the unsupervised training application 120 can perform any number and/or types of initialization operations on the end-to-end model 130 and/or the scene decomposition model 140. In some embodiments, the unsupervised training application 120 initializes any number of the learnable variables included in the scene decomposition model 140 in any technically feasible fashion. For instance, in some embodiments, the unsupervised training application 120 initializes the learnable codes ($e_1$-$e_K$) in the learnable codebook 152 in a uniformly bounded random fashion.

For explanatory purposes, the functionality of the unsupervised training application 120 in some embodiments is described below in the context of executing an exemplary iterative learning algorithm on the end-to-end model 130 based, at least in part, on the log-likelihood equation 176 to train the scene decomposition model 140. As described below, in some embodiments, the unsupervised training application 120 executes the exemplary iterative training process over the unlabeled training collection 102 for any number of epochs based on a mini-batch size of one.

In some other embodiments, the unsupervised training application 120 can execute the exemplary iterative training process over any set of scene point clouds for any number of epochs based on any mini-batch size and the techniques described below are modified accordingly. In general, the unsupervised training application 120 can execute any number and/or types of unsupervised training operations, algorithms, processes, or any combination thereof on the end-to-end model 130 to train the scene decomposition model 140 in any technically feasible fashion that is based, at least in part, on the log-likelihood equation 176.

In some embodiments, to initiate each iteration of an epoch, the unsupervised training application 120 determines the training point cloud 122 based on a different scene point cloud in the unlabeled training collection 102. In some embodiments, to initiate an iteration based on a scene point cloud, the unsupervised training application 120 sets the training point cloud 122 equal to the scene point cloud. In the same or other embodiments, to initiate an iteration based on a scene point cloud, the unsupervised training application determines whether the size of the scene point cloud exceeds a relevant limit (e.g., a limit associated with a random-access memory (RAM)). If the size of the scene point cloud exceeds the relevant limit, then the unsupervised training application 120 randomly and uniformly sub-samples the scene point cloud to generate the training point cloud 122. Otherwise, the unsupervised training application 120 sets the training point cloud 122 equal to the scene point cloud.

Subsequently, the unsupervised training application 120 propagates the training point cloud 122 through the end-to-end model 130 in a forward direction to generate any amount and/or types of data that is referred to herein as "forward pass data" (not shown). In some embodiments, after generating the forward pass data for an iteration, the unsupervised training application 120 implements any number and/or types of optimization techniques to update the values of any number of the learnable variables associated with the scene decomposition model 140. In some embodiments, the unsupervised training application 120 and optionally the EMA engine 158 optimize the values of learnable variables included in the point cloud bottleneck 142 based on the forward pass data and the overall loss function 178.

In some embodiments, the EMA engine 158 updates any number of learnable codes in the learnable codebook 152 based on the forward pass data. In the same or other embodiments, for each learnable code in the learnable codebook 152, the EMA engine 158 computes an associated EMA based on the total number and mean of the subset of the context features 144 that the quantization module 150 previously mapped to the learnable code as per the forward pass data. The EMA engine 158 then updates the values of any number of the learnable codes in the learnable codebook 152 based on the associated EMAs.

In some embodiments, the unsupervised training application 120 minimizes the overall loss function 178 to optimize the values of learnable variables included in the point cloud bottleneck 142. In the same or other embodiments, the overall loss function 178 includes, without limitation, a reconstruction loss term that is denoted $loss_{recon}$ and optionally any number and/or types of other loss terms. In some embodiments, the reconstruction loss term is associated with a training goal of maximizing the log-likelihood or approximated log-likelihood of reconstructing the scene point clouds included in the unlabeled training collection 102. In some embodiments, maximizing the log-likelihood or approximated log-likelihood of reconstructing the scene point cloud also increases the likelihood of reconstructing the training point cloud 122.

As persons skilled in the art will recognize, if the training point cloud 122 ($\mathcal{P}$) is a scene point cloud included in the unlabeled training collection 102, then maximizing the log-likelihood of the scene point cloud is equivalent to minimizing the negative log-likelihood of the scene point cloud. Accordingly, in some embodiments, if the training point cloud 122 ($\mathcal{P}$) is a scene point cloud included in the unlabeled training collection 102, then the unsupervised training application 120 implements the reconstruction loss term as per the following equation (13a):

$$loss_{recon} = -\log P(\mathcal{P}) \qquad (13a)$$

In equation (13a), "log P($\mathcal{P}$)" is defined via equation (12) described previously herein.

If the training point cloud 122 ($\mathcal{P}$) is a randomly and uniformly sub-sampled subset of the points in a scene point cloud (denoted herein as Q) that is included in the unlabeled training collection 102, then maximizing an approximated log-likelihood of the scene point cloud is equivalent to minimizing an approximated negative log-likelihood of the scene point cloud. Accordingly, in some embodiments, if P is a randomly and uniformly sub-sampled subset of the points in Q then the unsupervised training application 120 implements the reconstruction loss term as per equation (13b):

$$loss_{recon} = -E\mathcal{P}_{\sim Uniform(Q)} \log P(\mathcal{P}) \qquad (13b)$$

In equation (13b), "log P($\mathcal{P}$)" is defined via equation (12) described previously herein.

In some embodiments, the overall loss function 178 is a weighted sum of a reconstruction loss term and an entropy loss term (denoted herein as $loss_{entropy}$) that, when minimized, minimizes the entropy of the weights in the spatial features 146. More precisely, in some embodiments, the overall loss function 178 can be expressed as equation (14):

$$loss_{overall} = \alpha loss_{recon} + \beta loss_{entropy} \qquad (14)$$

In equation (14), the values of $\alpha$ and $\beta$ correspond to the relative contributions of the reconstruction loss and the entropy loss, respectively, to the overall loss. The unsupervised training application 120 can determine the values of $\alpha$ and $\beta$ in any technically feasible fashion. In some embodiments, the unsupervised training application 120 sets $\alpha$ to 1.0 and uses a cosine annealing schedule to increase the value of $\beta$ from 0 to 0.3 over the iterative training process.

In some embodiments, the unsupervised training application 120 implements the entropy loss term in the equation (14) as per equation (15):

$$loss_{entropy} = H(\pi) = -\sum_{j=1}^{J} \pi^{(j)} \log \pi^{(j)} \qquad (15)$$

As persons skilled in the art will recognize, minimizing the entropy loss term as defined in equation (14) can increase the likelihood that the scene decomposition model 140 learns values for learnable codes representing 3D geometric blocks that are meaningful objects instead of simple parts.

In some embodiments, the unsupervised training application 120 executes any type of backpropagation algorithm (not shown) on the end-to-end model 130 to optimize the values of learnable variables included in the point cloud bottleneck 142 based on the forward pass data and the overall loss function 178. More specifically, in some embodiments, the unsupervised training application 120 executes the backpropagation algorithm on the end-to-end model 130 based on the forward pass data to compute the gradient of the overall loss function 178 with respect to each of the learnable variables included in the point cloud bottleneck 142. In the same or other embodiments, because the quantization module 150 can implement a non-differentiable mapping, the backpropagation algorithm implements a straight-though estimation technique that estimates the gradients of the context features 144(1)-144(J) as the gradients of the quantized context features 148(1)-148(J), respectively.

Based on the computed gradients of the overall loss function 178, the unsupervised training application 120 replaces the values for the learnable variables included in the point cloud bottleneck 142 with optimized values for the learnable variables that minimize the overall loss function 178. As described previously herein, in some embodiments, minimizing the overall loss function 178 also maximizes the log-likelihood equation 176 and therefore replacing the values for the learnable variables with the optimized values for the learnable variables can increase the likelihood associated with reconstructing the training point cloud 122.

As noted previously herein, in some embodiments, the EMA engine 158 updates any number of the values of the learnable codes in the learnable codebook 152 based on the context features 144 and the quantized context features 148 included in the forward pass data. In some embodiments, for each learnable code in the learnable codebook 152, the EMA engine 158 computes an associated EMA based on the total number and mean of the subset of the context features 144 that the quantization module 150 previously mapped to the learnable code as per the forward pass data. The EMA engine 158 then updates the values of any number of the learnable codes in the learnable codebook 152 based on the associated EMAs.

In some other embodiments, the unsupervised training application 120 can update or replace the values of the learnable codes in the learnable codebook 152 in any technically feasible fashion. For instance, in some embodiments, the overall loss function 178 includes a term that is based on the learnable codes, and the unsupervised training application 120 executes a backpropagation algorithm and/or any number and/or types of backpropagation operations to optimize all the learnable variables included in the scene decomposition model 140. In some embodiments, the EMA engine 158 is omitted from the unsupervised training application 120 and the overall loss function 178 includes one or more additional terms that are commonly referred to as a "codebook alignment loss."

The unsupervised training application 120 can determine that the scene decomposition model 140 is trained based on any number and/or types of triggers (e.g., after executing a maximum number of epochs or reaching a target value for a training metric). When the unsupervised training application 120 determines that the scene decomposition model 140 is trained, the unsupervised training application 120 terminates the training process. Subsequently, the scene decomposition model 140 is also referred to herein as a trained scene decomposition model 180. For explanatory purposes, the trained scene decomposition model 180 has a "learned" value for each learnable variable. Learnable variables having learned values are also referred to herein as "learned variables." More specifically, learnable weights and learnable codes having learned values are also referred to herein as "learned weights" and "learned codes," respectively.

The unsupervised training application 120 can store any portions (including all) of the trained scene decomposition model 180 or the corresponding learned variables in any number and/or types of memories. As shown, in the same or other embodiments, the unsupervised training application 120 can transmit any portions (including all) of the trained scene decomposition model 180 or the corresponding learned variables to any number and/or types of software applications. Advantageously, any portion (including all) of the trained scene decomposition model 180 can be used to infer compositional representations of point clouds representing 3D scenes irrespective of the number and/or orientations of instances of 3D objects in each of the 3D scenes. For instance, in some embodiments, executing the trained scene decomposition model 180 on a scene point cloud causes the trained scene decomposition model 180 to generate a representation of a set of 3D geometry instances.

In some embodiments, the learned variables in a trained point cloud bottleneck and/or the trained point cloud bottleneck can be extracted from the trained scene decomposition model 180 and used to map a scene point cloud to context features and/or spatial features 146. In the same or other embodiments, the trained scene decomposition model 180 or the learned variables in the trained scene decomposition model 180 can be used to map a scene point cloud to the quantized context features 148 and/or spatial features 146. In some embodiments, any type of software application can perform any number and/or types of inference operations and/or any number and/or types of training operations based on any portion of the trained scene decomposition model 180.

As shown, in some embodiments, a transfer learning application 190 resides in a memory 116(2) of a compute instance 110(2) and executes on a processor 112(2) of the compute instance 110(2). The transfer learning application 190 can perform any number and/or types of transfer learning operations on a task model 196 based on the trained scene decomposition model 180 and the labeled training collection 108 to generate a trained task model 198. For instance, in some embodiments, the transfer learning application 190 performs one or more transfer learning operations on the task model 196 to train the task model 196 to perform a task on one or more point clouds. In the same or other embodiments, the task model 196 includes, without limitation, a least a portion of the trained scene decomposition model 180. The task model 196 is also referred to herein as a "task-specific ML model." For explanatory purposes, a version of the task model 196 that is trained to perform one or more tasks is also referred to herein as the trained task model 198.

The labeled training collection 108 includes, without limitation, any number of labeled scene point clouds. In some embodiments, the transfer learning application 190 generates the trained task model 198 that maps a scene point cloud to instances of objects. In some other embodiments, the transfer learning application 190 generates the trained task model 198 that maps a scene point cloud to classifications (e.g., vehicles, pedestrians, traffic poles) of instances of objects in the scene point cloud.

As persons skilled in the art will recognize, when the unsupervised training application 120 stops the iterative training process, the generative model 160 has learned values for variables that are implicitly defined by the scene decomposition model 140 and optionally any number and/or types of other variables and is also referred to herein as a "trained generative model" (not shown). Although not shown, in some embodiments, the unsupervised training application 120 can store any portions (including all) of the trained generative model in any number and/or types of memories. In the same or other embodiments, the unsupervised training application 120 can transmit any portions (including all) of the trained generative model to any number and/or types of software applications. Advantageously, in some embodiments, the trained generative model can be used to, without limitation, add points to, add instances of objects to, remove instances of objects from, and modify instances of objects within scene point clouds.

Note that the techniques described herein are illustrative rather than restrictive and can be altered without departing from the broader spirit and scope of the invention. Many modifications and variations on the functionality of the unsupervised training application 120, the end-to-end model 130, the scene decomposition model 140, the point cloud bottleneck 142, the quantization module 150, the generative model 160, the global-to-local converter 162, the conditional normalizing flow 170, the latent prior distribution 172, the EMA engine 158, the trained scene decomposition model 180, the transfer learning application 190, the task model 196, and the trained task model 198 as described herein will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

Similarly, many modifications and variations on the training point cloud 122, the learnable codebook 152, the spatial features 146, the context features 144, and the quantized context features 146, the log-likelihood equation 176, and the overall loss function 178 as described herein will be apparent to those of ordinary skill in the art without departing from the scope and spirit of the described embodiments.

It will be appreciated that the system 100 shown herein is illustrative and that variations and modifications are possible. For example, the functionality provided by the unsupervised training application 120 and the end-to-end model 130 as described herein can be integrated into or distributed across any number of software applications (including one), neural networks, and any number of components of the system 100. Further, the connection topology between the various units in FIG. 1 can be modified as desired.

Decomposing 3D Scenes Based on a Segmentation Network

FIG. 2 is a more detailed illustration of the point cloud bottleneck 142 of FIG. 1, according to various embodiments. More specifically, in some embodiments including embodiments depicted in and described in conjunction with FIG. 2, the point cloud bottleneck 142 is a point cloud bottleneck 242 that is based on a segmentation network 210. As shown, in some embodiments, the point cloud bottleneck 242 includes, without limitation, the segmentation network 210, a Gaussian recovery module 260, a projection head 270, and a weighting module 290.

In some embodiments, the point cloud bottleneck 242 maps a scene point cloud to a set of J context features and a set of J spatial features, where J is a positive integer. For explanatory purposes, the point cloud bottleneck 242 is depicted and described in FIG. 2 in the context of the scene decomposition model 140 depicted in FIG. 1. More specifically, in some embodiments including embodiments depicted in and described in conjunction with FIG. 2, the point cloud bottleneck 242 is described in the context of mapping the training point cloud 122 to context feature 244(1)-context feature 244(J) and spatial feature 246(1)-spatial feature 246(J), where J is equal to the cloud block count 132. For explanatory purposes, the context feature 244(1)-the context feature 244(J) are also referred to herein individually as a "context feature 244" and collectively as "context features 244" and context features 244(1)-244(J)." The spatial feature 246(1)-the spatial feature 246(J) are also referred to herein individually as a "spatial feature 246" and collectively as "spatial features 246" and "spatial features 246(1)-246(J)."

As shown, the training point cloud 122 includes, without limitation, a point 208(1)-a point 208(N), where N can be any positive integer. For explanatory purposes, the point 208(1)-the point 208(N) are also referred to herein individually as a "point 208" and collectively as "points 208." The training point cloud 122 is denoted herein as $\mathcal{P}$, and the points 208(1)-208(N) are denoted herein as $p_1$-$p_N$. The 3D coordinates of the point 208(1) $p_i$, where i is any integer from 1 through N, are denoted herein as $(x_i, y_i, z_i)$.

The segmentation network 210 can be any type of ML model that includes, without limitation, multiple learnable variables (e.g., weights) and can map the points 208(1)-208(N) to a soft-segmentation 250(1)-a soft-segmentation 250(N) in any technically feasible fashion. For explanatory purposes, the soft-segmentation 250(1)-the soft-segmentation 250(N) are also referred to herein individually as a "soft-segmentation 250" and "segmentation," and collectively as "soft-segmentations 250," "soft-segmentations 250 (1)-250(N)," and "segmentations."

A "soft-segmentation," as used herein, is a distribution of probabilities across a fixed set of discrete items (e.g., clusters of points within a point cloud or categories). In some embodiments, each of the soft-segmentations 250(1)-250(N) specifies, for the points 208(1)-208(N), respectively, J different probabilities associated with the same J clusters of points within the training point cloud 122. In the same or other embodiments, the soft-segmentation 250(i), where i is any integer from 1 through N, is a set of J values that each predict a probability of the point 208(1) belonging to or being assigned to a different cluster in a set of J clusters. For explanatory purposes, for any integer i from 1 through N, the soft-segmentation 250(1) is denoted herein as $y_i$ and includes, without limitation, J values denoted as $(yi_1\text{-}yi_J)$.

As shown, in some embodiments, the segmentation network 210 includes, without limitation, a classification network 220 and a multi-layer perceptron (MLP) 240. The classification network 220 can be any type of point-wise classification ML model. In some embodiments, the classification network 220 is a neural network that includes, without limitation, multiple learnable variables and can map the points 208(1)-208(N) to a per-point feature 230(1)-a per-point feature 230(N), respectively. For explanatory purposes, the per-point feature 230(1)-the per-point feature 230(N) are also referred to herein individually as a "per-point feature 230" and collectively as "per-point features 230" and "per-point features 230(1)-230(N)."

In some embodiments, each of the per-point features 230 is a classification vector that includes, without limitation, J unnormalized numerical scores or "logits" corresponding to a set of J clusters of points. In the same or other embodiments, as the unsupervised training application 120 trains the scene decomposition model 140, the classification network 220 learns to probabilistically assign each point in a scene point cloud to J clusters of points. The set of J clusters of points is also referred to herein as "the set of J clusters" and "the J clusters." The J clusters are also referred to herein as "J soft-segments" and "J spatial partitions."

The segmentation network 210 can generate the soft-segmentations 250 based on the per-point features 230 in any technically feasible fashion. In some embodiments, the segmentation network 210 normalizes each of the per-point features 230(1)-230(N) in any technically feasible fashion to generate the soft-segmentations 250(1)-250(N), respectively. As shown, in the same or other embodiments, the MLP 240 maps the per-point features 230(1)-230(N) to the soft-segmentations 250(1)-250(N). The MLP 240 can map the per-point features 230 to the soft-segmentations 250 in any technically feasible fashion. For instance, in some embodiments, for an integer i from 1 through N, the MLP 240 executes a softmax function on the per-point feature 230(i) to compute the soft-segmentation 250(i).

The point cloud bottleneck 242 can model the J clusters associated with the soft-segmentations 250 in any technically feasible fashion to determine spatial features 246(1)-246(J) and context features 244(1)-244(J). In some embodiments, the Gaussian recovery module 260, the projection head 270 and the weighting module 290 collectively model the set of J clusters based on a premise that the set of J clusters are induced by a mixture of J 3D Gaussians corresponding to the spatial features 246(1)-246(J) and the context features 244(1)-244(J).

As shown, in some embodiments, the Gaussian recovery module 260 computes the spatial features 246(1)-246(J) that collectively describe spatial information for a modeled mixture of J Gaussians based on the soft-segmentations 250(1)-250(N) and the points 208(1)-208(N). As shown in FIG. 2 and as described previously herein in conjunction with FIG. 1, in some embodiments, the spatial feature 246(j), where j is any integer from 1 through J, specifies a weight, a mean, and a lower triangular Cholesky decomposed covariance of a $j^{th}$ 3D Gaussian in a mixture of J 3D Gaussians and is denoted herein as $\{\pi^{(j)}, \mu^{(j)}, L^{(j)}\}$.

In some embodiments, the Gaussian recovery module 260 constructs the spatial features 246 in accordance with expectation maximization. More precisely, to compute the spatial feature 246(j), where j is any integer from 1 through J, the Gaussian recovery module 260 computes the weight $\pi^{(j)}$, the mean $\mu^{(j)}$, and a covariance matrix for the $j^{th}$ 3D Gaussian (denoted herein as $\Sigma^{(j)}$) using equations (16), (17), and (18), respectively.

$$\pi^{(j)} = \frac{1}{N}\sum_{i=1}^{N}\gamma_{ij} \qquad (16)$$

$$\mu^{(j)} = \frac{1}{N\pi^{(j)}}\sum_{i=1}^{N}\gamma_{ij}p_i \qquad (17)$$

$$\Sigma^{(j)} = \frac{1}{N\pi^{(j)}}\sum_{i=1}^{N}\gamma_{ij}(p_i - \mu^{(j)})(p_i - \mu^{(j)})^T \qquad (18)$$

In the same or other embodiments, the Gaussian recovery module 260 decomposes the covariance matrices $\Sigma^{(1)}$-$\Sigma^{(J)}$ using Cholesky decomposition or eigendecomposition to determine $L^{(1)}$-$L^{(J)}$ as per equation (19):

$$\Sigma^{(j)} = L^{(j)}(L^{(j)})^T \qquad (19)$$

Referring back to FIG. 1, the coordinates of the points 208(1)-208(N) can be transformed from the global coordinate system associated with the training point cloud 122 to the local coordinate system associated with the $j^{th}$ 3D Gaussian in the mixture of J 3D Gaussians using the equation (2), $\mu^{(j)}$, and $L^{(j)}$.

As shown, in some embodiments, the projection head 270 maps the per-point feature 230(1)-the per-point feature 230(N) to a latent per-point feature 280(1)-a latent per-point feature 280(N), respectively. In some embodiments, the projection head 270 is a feed-forward neural network (e.g., an MLP) that has a relatively small number of layers. In some other embodiments, the projection head 270 can be any type of other model (e.g., another type of neural network or a software algorithm). For explanatory purposes, the latent per-point feature 280(1)-the latent per-point feature 280(N) are denoted herein as $c_1$-$C_N$, respectively.

In some embodiments, each of the context features 244(1)-244(J) is associated with a different 3D Gaussian in the mixture of J 3D Gaussians. As shown, in the same or other embodiments, the weighting module 290 computes the context features 244(1)-244(J) (denoted herein as $g^{(1)}$-$g^{(J)}$) based on the soft-segmentations 250(1)-250(N), weights $g^{(1)}$-$g^{(J)}$) of the J 3D Gaussians, and the latent per-point feature 280(1)-the latent per-point feature 280(N) (denoted herein as $c_1$-$C_N$). In the same or other embodiments, for an integer j from 1 through J, the weighting module 290 sets the context feature 244(j) equal to a weighted sum of the latent per-point feature 280(1)-the latent per-point feature 280(N), as per the following equation (20):

$$g^{(j)} = \frac{1}{N\pi^{(j)}}\sum_{i=1}^{N}\gamma_{ij}c_i \qquad (20)$$

Although not shown, in some embodiments, the point cloud bottleneck 242 or any component in the point cloud bottleneck 242 (e.g., the segmentation network 210, the Gaussian recovery module 260, or the weighting module 290) can determine the latent variables denoted herein as $d_1$-$d_N$ based, at least in part, on the soft-segmentations 250(1)-250(N) in any technically feasible fashion. The latent context variable $d_i$, where i is any integer from 1 through N, specifies an index j, where j is an integer from 1 through J, corresponding to the cluster that is most likely to include the point 208(1). Consequently, as described previously herein in conjunction with FIG. 1, the latent context variables $d_1$-$d_N$ specify predicted assignments of the points 208(1)-208(N), respectively, to J 3D geometric instances.

Advantageously, as persons skilled in the art will recognize, the point cloud bottleneck 242 is permutation-invariant. Accordingly, the point cloud bottleneck 242 consistently maps different scene point clouds that are different orderings of the same set of points to the same spatial features 246 and the same context features 244 in the same order.

It will be appreciated that the point cloud bottleneck 242, the segmentation network 210, the classification network 220, the MLP 240, the Gaussian recovery module 260, the projection head 270, and the weighting module 290 shown herein are illustrative and that variations and modifications are possible. For instance, in some embodiments, the segmentation network 210 can be any type of neural network that includes, without limitation, multiple learnable variables and maps N points to N×J values representing predicted probabilities between the points and J clusters in any technically feasible fashion. In the same or other embodiments, the segmentation network 210 is a classification network that generates the soft-segmentations 250 instead of or in addition to the per-point features 230.

Figure 3A:
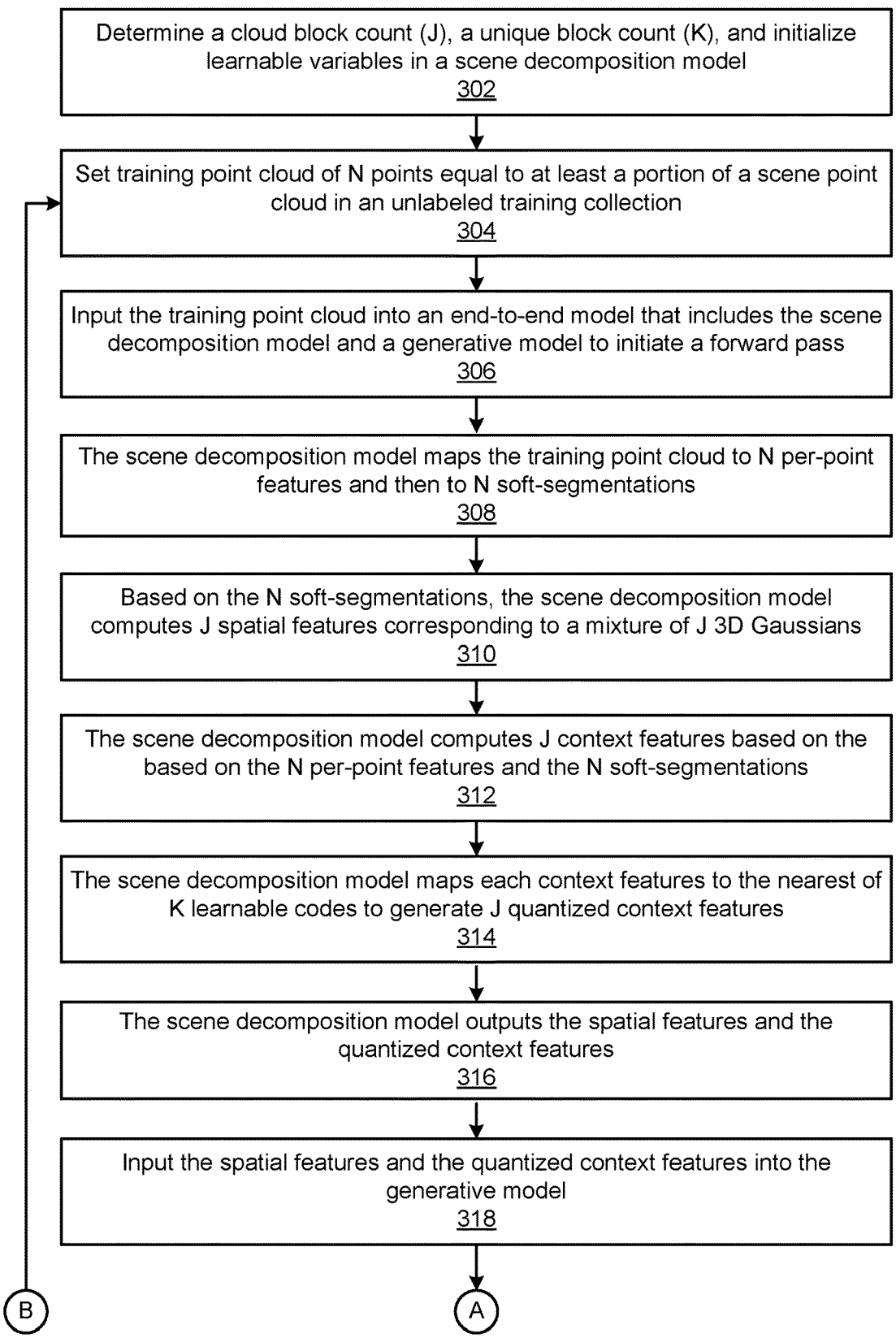
FIGS. 3A-3B set forth a flow diagram of method steps for training a machine learning model to generate compositional representations of scene point clouds, according to various embodiments.
Figure 3B:
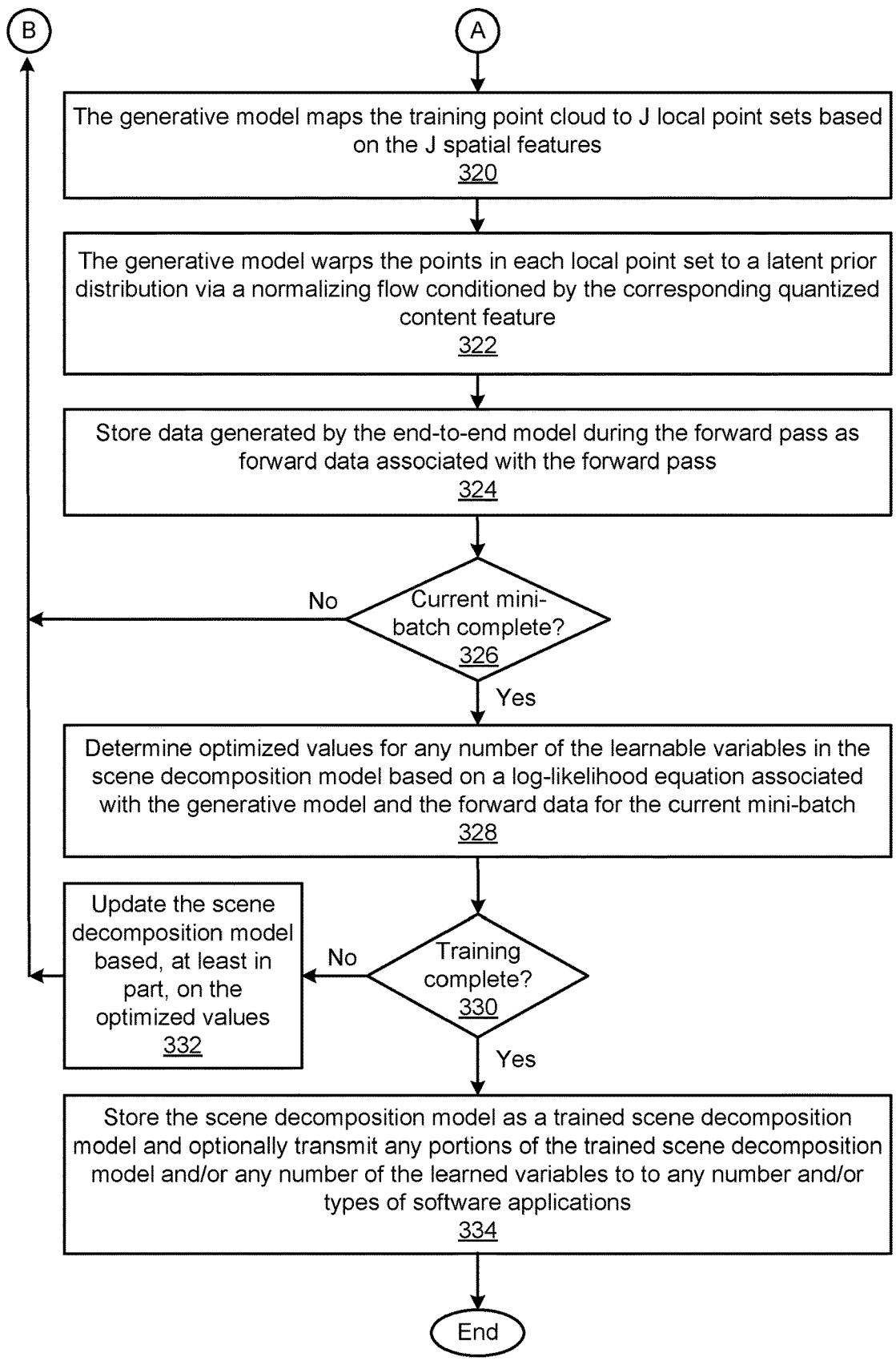

FIGS. 3A-3B set forth a flow diagram of method steps for training a machine learning model to generate compositional representations of scene point clouds, according to various embodiments. More specifically, FIGS. 3A-3B describe training a machine learning model that includes a segmentation network to generate compositional representations of scene point clouds, in some embodiments. Although the method steps are described with reference to the systems of FIGS. 1-2, persons skilled in the art will understand that any system configured to implement the method steps, in any order, falls within the scope of the present invention.

As shown, a method 300 begins at step 302, where the unsupervised training application 120 determines the cloud block count 132 of J, the unique block count 134 of K, and initializes learnable variables in scene decomposition model 140. At step 304, the unsupervised training application 120 sets the training point cloud 122 of N points equal to at least a portion of a scene point cloud in unlabeled training collection 102. At step 306, the unsupervised training application 120 inputs the training point cloud 122 into the end-to-end model 130 to initiate a forward pass. The end-to-end model 130 includes, without limitation, the scene decomposition model 140 and the generative model 160.

At step 308, the scene decomposition model 140 maps the training point cloud 122 to per-point features 230(1)-230(N) and then to soft-segmentations 250(1)-250(N). At step 310, based on the soft-segmentations 250(1)-250(N), the scene decomposition model 140 computes spatial features 246(1)-

246(J) corresponding to a mixture of J 3D Gaussians. At step 312, the scene decomposition model 140 computes context features 244(1)-244(J) based on the based on the per-point features 230(1)-230(N) and the soft-segmentations 250(1)-250(N), At step 314, the scene decomposition model maps each of the context features 244(1)-244(J) to the nearest of J learnable codes in learnable codebook 152 to generate quantized context features 148(1)-148(J). At step 316, the scene decomposition model 140 outputs the spatial features 246(1)-246(J) and the quantized context features 148(1)-148(J).

At step 318, the unsupervised training application 120 inputs the training point cloud 122, the spatial features 246(1)-246(J), and the quantized context features 148(1)-148(J) into the generative model 160. At step 320, the generative model 160 maps the training point cloud 122 to local point sets 164(1)-164(J) based on the spatial features 246(1)-246(J). At step 322, the generative model 160 warps the points in each of the local point sets 164(1)-164(J) to the latent prior distribution 172 via a normalizing flow conditioned by the quantized context features 148(1)-148(J), respectively.

At step 324, the unsupervised training application 120 stores data generated by the end-to-end model 130 during the forward pass as forward data associated with the forward pass. At step 326, the unsupervised training application 120 determines whether a current mini-batch is complete. If, at step 326, the unsupervised training application 120 determines that the current mini-batch is not complete, then the method 300 returns to step 304, where the unsupervised training application 120 sets the training point cloud 122 equal to at least a portion of a scene point cloud in unlabeled training collection 102.

If, however, at step 326, the unsupervised training application 120 determines that the current mini-batch is complete, then the method 300 proceeds to step 328. At step 328, the unsupervised training application 120 determines optimized values for any number of the learnable variables in the scene decomposition model 140 based on the log-likelihood equation 176 associated with the generative model 160 and the forward data for the current mini-batch.

At step 330, the unsupervised training application 120 determines whether the training of the scene decomposition model 140 is complete. If, at step 330, the unsupervised training application 120 determines that the training of the scene decomposition model 140 is not complete, then the method 300 proceeds to step 332. At step 332, the unsupervised training application 120 updates the scene decomposition model 140 based, at least in part, on the optimized values, and the method 300 returns to step 304, where the unsupervised training application 120 sets the training point cloud 122 equal to at least a portion of a scene point cloud in unlabeled training collection 102.

If, however, at step 330, the unsupervised training application 120 determines that the training of the scene decomposition model 140 is complete, then method 300 proceeds directly to step 334. At step 334, the unsupervised training application 120 stores the scene decomposition model 140 as trained scene decomposition model 180 and optionally transmit any portions of the trained scene decomposition model 180 and/or any number of the learned variables to any number and/or types of software applications. The method 300 then terminates.

Decomposing 3D Scenes Based on a Transformer Decoder

Figure 4:
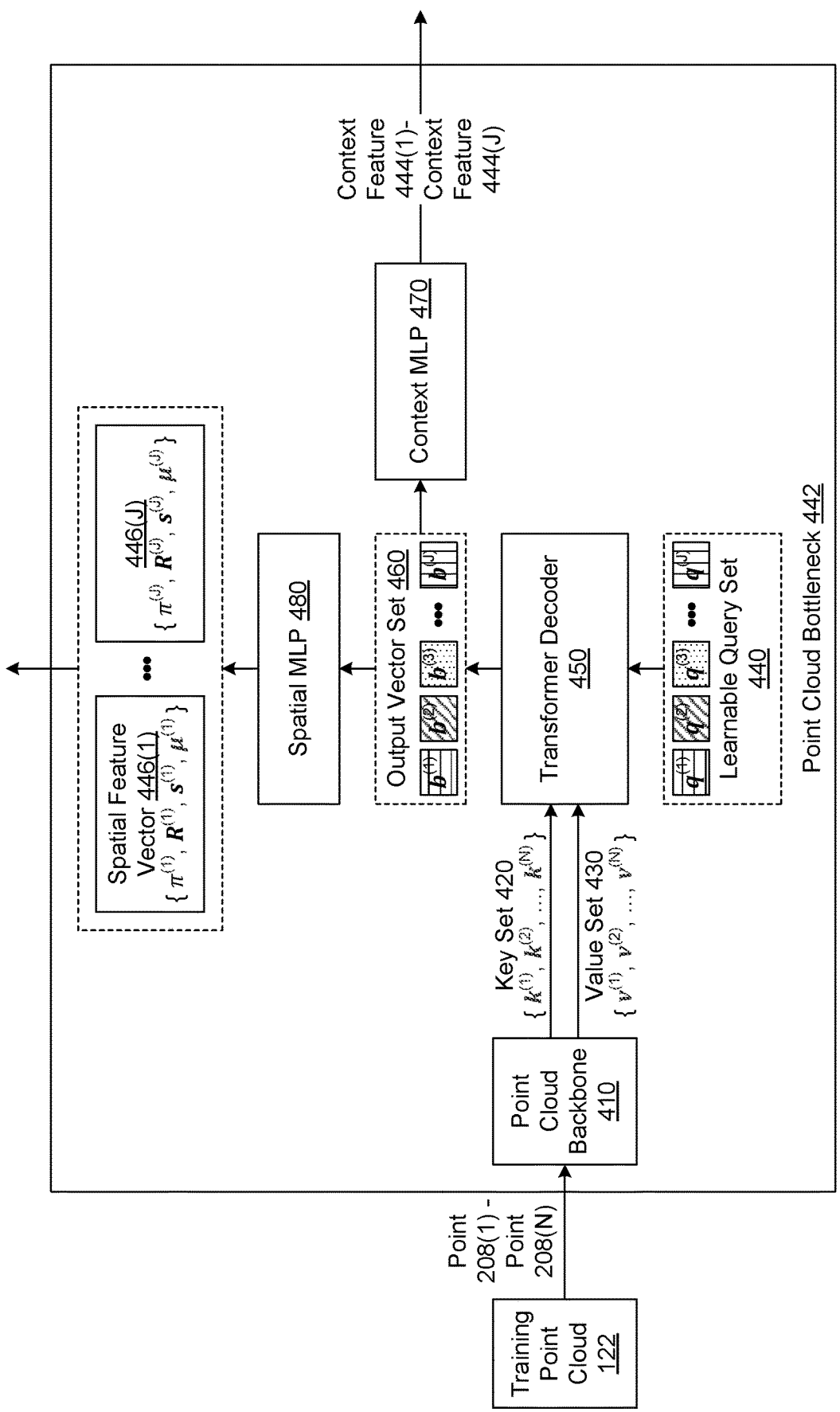
FIG. 4 is a more detailed illustration of the point cloud bottleneck of FIG. 1, according to other various embodiments.

FIG. 4 is a more detailed illustration of the point cloud bottleneck 142 of FIG. 1, according to other various embodiments. More specifically, in some embodiments including embodiments depicted in and described in conjunction with FIG. 4, the point cloud bottleneck 142 is a point cloud bottleneck 442 that is based on a transformer decoder 450. As shown, in some embodiments, the point cloud bottleneck 442 includes, without limitation, a point cloud backbone 410, a learnable query set 440, the transformer decoder 450, an output vector set 460, a context MLP 470, and a spatial MLP 480.

In some embodiments, the point cloud bottleneck 442 maps a 3D scene point cloud to a set of J context features and a set of J spatial features, where J is a positive integer. For explanatory purposes, the point cloud bottleneck 442 is depicted and described in FIG. 4 in the context of the scene decomposition model 140 depicted in FIG. 1. More specifically, in some embodiments including embodiments depicted in and described in conjunction with FIG. 4, the point cloud bottleneck 442 is described in the context of mapping the training point cloud 122 to context feature 444(1)-context feature 444(J) and spatial feature 446(1)-spatial feature 446(J), where J is equal to the cloud block count 132. For explanatory purposes, the context feature 444(1)-the context feature 444(J) are also referred to herein individually as a "context feature 444" and collectively as "context features 444" and context features 444(1)-444(J)." The spatial feature 446(1)-the spatial feature 446(J) are also referred to herein individually as a "spatial feature 446" and collectively as "spatial features 446" and "spatial features 446(1)-446(J)."

As described previously herein in conjunction with FIG. 2, in some embodiments, the training point cloud 122 includes, without limitation, the points 208(1) 208(N), where N can be any positive integer. For explanatory purposes, and as noted previously herein in conjunction with FIG. 2, the training point cloud 122 is denoted herein as $\mathcal{P}$, the point 208(1), where i is any integer from 1 through N, is denoted herein as $p_i$, and the 3D coordinates of $p_i$ are denoted herein as $(x_i, y_i, z_i)$.

The point cloud backbone 410 can be any type of neural network that includes, without limitation, multiple learnable variables (e.g., weights) and maps the points 208(1)-208(N) to a key set 420 and a value set 430. For instance, in some embodiments, the point cloud backbone 410 is a convolutional neural network. The key set 420 includes, without limitation, N keys and is denoted herein as $\{k^{(1)}, k^{(2)}, \ldots, k^{(N)}\}$. The value set 430 includes, without limitation, N values and is denoted herein as $\{v^{(1)}, v^{(2)}, \ldots, v^{(N)}\}$. In some embodiments, each of the values in the value set 430 is a vector.

In some embodiments, the transformer decoder 450 can be any type of permutation-invariant model that, includes, without limitation, any number and/or types of attention mechanisms and can generate the output vector set 460 and optionally updates the learnable query set 440 based on the learnable query set 440, the key set 420 and the value set 430. For instance, in some embodiments, the transformer decoder 450 is a permutation-invariant neural network that includes, without limitation, any number and/or types of attention layers. In the same or other embodiments, the transformer decoder 450 is a permutation-invariant multi-head self-attention model.

As shown, in some embodiments, the learnable query set 440 includes, without limitation, J different learnable queries (not shown), where J is the cloud block count 132. For explanatory purposes, the learnable query set 440 is denoted herein as $\{q^{(1)}, q^{(2)}, \ldots, q^{(J)}\}$. In some embodiments, each of the queries in the learnable query set 440 is a vector that can include, without limitation, any number of values. The learnable query set 440 can be initialized in any technically feasible fashion. For instance, in some embodiments, the point cloud bottleneck 442 and/or the transformer decoder 450 can initialize the learnable query set 440. In the same or other embodiments the learnable query set 440 is initialized as a Normal Distribution centered with zero mean and identity covariance matrix.

Referring back now to FIG. 1, in some embodiments, as the unsupervised training application 120 performs training operations (also referred to herein as learning operation) on the end-to-end model 130, the transformer decoder 450 and/or type unsupervised training application 120 updates or "learns" the values of the learnable queries in the learnable query set 440. The values of the learnable queries in the trained version of the transformer decoder 450 that is included in the trained scene decomposition model 180 are also referred to herein as "learned queries."

In some embodiments, the output vector set 460 includes, without limitation, J different output vectors (not shown), where J is the cloud block count 132. As shown, the output vector set 460 is denoted herein as $\{b^{(1)}, b^{(2)}, \ldots, b^{(J)}\}$. In some embodiments, each of the output vectors in the output vector set 460 is a vector. In the same or other embodiments, the length of each of the output vectors in the output vector set 460 is same as the length of each value in the value set 430. In some embodiments, each of the output vectors in the output vector set 460 corresponds to a different cluster in a set of J clusters.

In some embodiments, the transformer decoder 450 can execute any number and/or types of attention operations (e.g., cross-attention operations, self-attention operation) based on the key set 420, the value set 430, and the learnable query set 440 in any technically feasible fashion to generate the output vector set 460 and update the learnable query set 440. In some embodiments, using the learnable query set 440, the transformer decoder 450 applies cross-attention with respect to the keys in the key set 420 and the values in the value set 430 to generate the output vector set 460. In the same or other embodiments, the transformer decoder 450 can use any number and/or types of attention equations to regenerate, replace, or update the learnable query set 440 based on at least one of the key set 420, the value set 430, the learnable query set 440, or the output vector set 460.

In some embodiments, the transformer decoder 450 includes, without limitation, multiple attention layers. In the same or other embodiments, each attention layer included in the transformer decoder 450 implements any type of attention function that is associated with any type of compatibility function. In some embodiments, for each of J input queries, each attention layer computes N compatibility scores, where each compatibility score predicts a degree of matching between the input query and a different key in the key set 420. In the same or other embodiments, the attention layer sets each of J output vectors equal to a weighted sum of the values in the value set 430, where the weight of each value is equal to the compatibility score for the associated key.

In some embodiments, the input queries for an initial attention layer are the learnable queries in the learnable query set 440, and the input queries for a non-initial attention layer are the output vectors generated by the preceding attention layer. In the same or other embodiments, the output vector set 460 is the set of output vectors generated by a final attention layer. In some embodiments, the transformer decoder 450 updates the learnable query set 440 based on the output vector set 460, the key set 420, the value set 430, the learnable query set 440, or any combination thereof.

As shown, in some embodiments, the context MLP 470 and the spatial MLP 480 map the output vector set 460 to context features 444 and spatial features 446, respectively. In some embodiments, the context MLP 470 can be any type of neural network that can decode the output vectors $b^{(1)}$-$b^{(J)}$ into the context features 444(1)-444(J), respectively, in any technically feasible fashion. In the same or other embodiments, the spatial MLP 480 can be any type of neural network that can decode the output vectors $b^{(1)}$-$b^{(J)}$ into the spatial features 446(1)-446(J), respectively, in any technically feasible fashion.

As described previously herein in conjunction with FIG. 1, in some embodiments, the spatial feature 446(j), where j is any integer from 1 through J, specifies values corresponding to a normalized mixture weight, a rotation matrix, a 3D scaling factor, and a translation for a $j^{th}$ cluster in a mixture of J clusters. As shown, on the same or other embodiments, the spatial feature 446(j) is denoted as $\{\pi^{(j)}, R^{(j)}, s^{(j)}, \mu^{(j)}\}$, where $\pi^{(j)}$ denotes a normalized mixture weight; $R^{(j)}$ denotes a rotation matrix that is encoded using six values; $s^{(j)}$ denotes a scaling factor in the x, y, and z dimensions; and $\mu^{(j)}$ denotes a translation.

Referring back to FIG. 1, the coordinates of the points 208(1)-208(N) can be transformed from the global coordinate system associated with the training point cloud 122 to the local coordinate system associated with the $j^{th}$ cluster in the mixture of J 3D clusters using the equation (3), $R^{(j)}$, $s^{(j)}$, and $\mu^{(j)}$.

Advantageously, as persons skilled in the art will recognize, because the transformer decoder 450 is permutation-invariant, the point cloud bottleneck 442 is also permutation-invariant. Accordingly, the point cloud bottleneck 442 consistently maps different scene point clouds that are different orderings of the same set of points to the same spatial features 446 and the same context features 444 in the same order.

It will be appreciated that the point cloud bottleneck 442, the point cloud backbone 410, the transformer decoder 450, the context MLP 470, and the spatial MLP 480 shown herein are illustrative and that variations and modifications are possible.

Figure 5A:
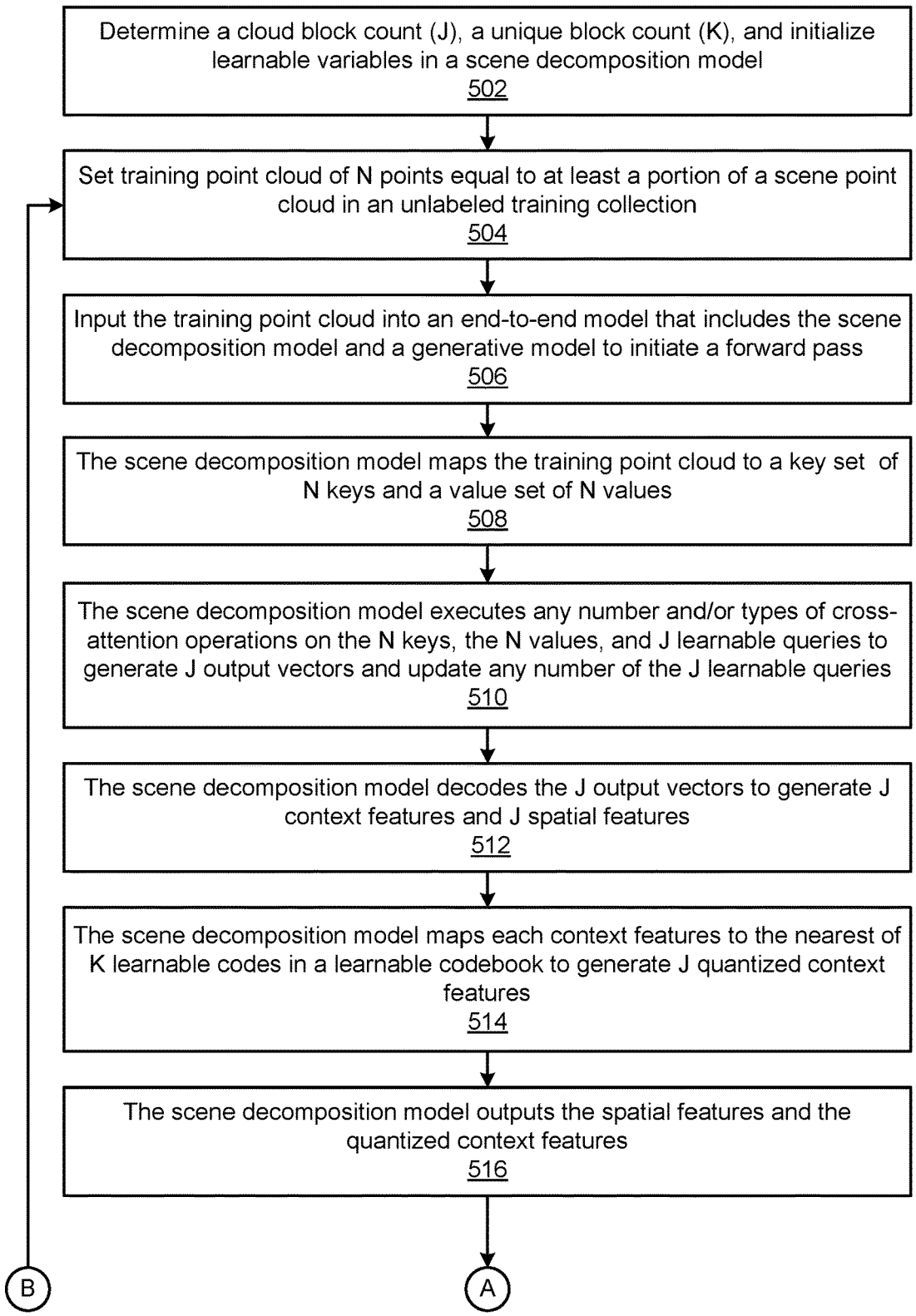
FIGS. 5A-5B set forth a flow diagram of method steps for training a machine learning model to generate compositional representations of scene point clouds, according to other various embodiments.
Figure 5B:
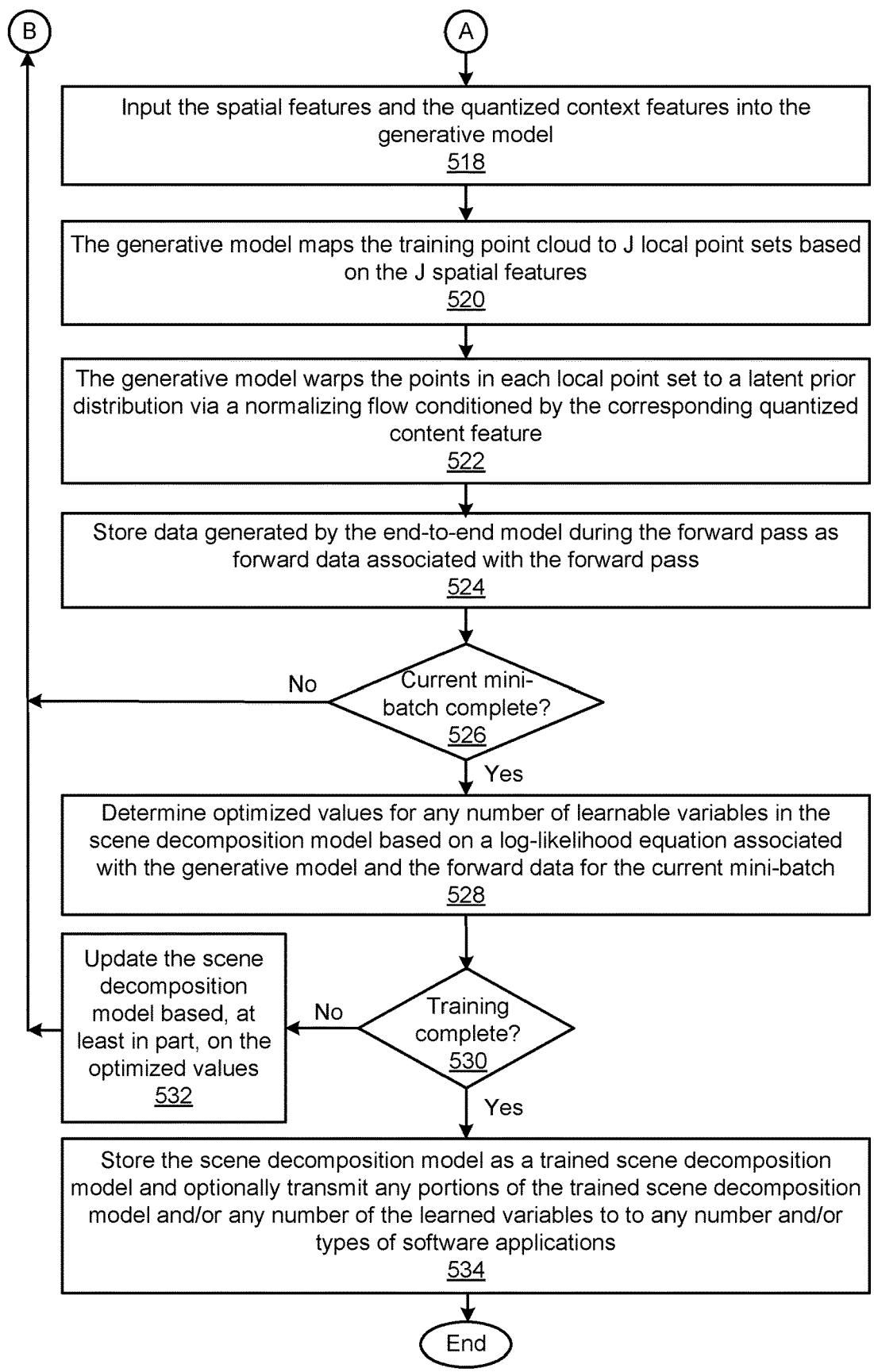

FIGS. 5A-5B set forth a flow diagram of method steps for training a machine learning model to generate compositional representations of scene point clouds, according to other various embodiments. More specifically, FIGS. 5A-5B describe training a machine learning model that includes a transformer decoder to generate compositional representations of scene point clouds, in some embodiments. Although the method steps are described with reference to the systems of FIGS. 1 and 4, persons skilled in the art will understand that any system configured to implement the method steps, in any order, falls within the scope of the present invention.

As shown, a method 500 begins at step 502, where the unsupervised training application 120 determines cloud block count 132 of J, unique block count 134 of K, and initializes learnable variables in scene decomposition model 140. At step 504, the unsupervised training application 120 sets the training point cloud 122 of N points equal to at least a portion of a scene point cloud in unlabeled training collection 102. At step 506, the unsupervised training application 120 inputs the training point cloud 122 into the end-to-end model 130 to initiate a forward pass. The end-to-end model 130 includes, without limitation, the scene decomposition model 140 and the generative model 160.

At step 508, the scene decomposition model 140 maps the training point cloud 122 to key set 420 of N keys and value set 430 of N values. At step 510, the scene decomposition model 140 executes any number and/or types of cross-attention operations on the N keys in the key set 420, the N values in the value set 430, and J learnable queries in learnable query set 440 to generate J output vectors that are included in the output vector set 460 and updates any number of the J learnable queries in the learnable query set 440. At step 512, the scene decomposition model 140 decodes the output vectors in the output vector set 460 to generate spatial features 446(1)-446(J) and context features 444(1)-444(J). At step 514, the scene decomposition model maps each of the context features 444(1)-444(J) to the nearest of J learnable codes in learnable codebook 152 to generate quantized context features 148(1)-148(J), respectively. At step 516, the scene decomposition model 140 outputs the spatial features 446(1)-446(J) and the quantized context features 148(1)-148(J).

At step 518, the unsupervised training application 120 inputs the training point cloud 122, the spatial features 446(1)-446(J), and the quantized context features 148(1)-148(J) into the generative model 160. At step 520, the generative model 160 maps the training point cloud 122 to local point sets 164(1)-164(J) based on the spatial features 446(1)-446(J). At step 522, the generative model 160 warps the points in each of the local point sets 164(1)-164(J) to latent prior distribution 172 via a normalizing flow conditioned by the quantized context features 148(1)-148(J), respectively.

At step 524, the unsupervised training application 120 stores data generated by the end-to-end model 130 during the forward pass as forward data associated with the forward pass. At step 526, the unsupervised training application 120 determines whether a current mini-batch is complete. If, at step 526, the unsupervised training application 120 determines that the current mini-batch is not complete, then the method 500 returns to step 504, where the unsupervised training application 120 sets the training point cloud 122 equal to at least a portion of a scene point cloud in unlabeled training collection 102.

If, however, at step 526, the unsupervised training application 120 determines that the current mini-batch is complete, then the method 500 proceeds to step 528. At step 528, the unsupervised training application 120 determines optimized values for any number of the learnable variables in the scene decomposition model 140 based on the log-likelihood equation 176 associated with the generative model 160 and the forward data for the current mini-batch.

At step 530, the unsupervised training application 120 determines whether the training of the scene decomposition model 140 is complete. If, at step 530, the unsupervised training application 120 determines that the training of the scene decomposition model 140 is not complete, then the method 500 proceeds to step 532. At step 532, the unsupervised training application 120 updates the scene decomposition model 140 based, at least in part, on the optimized values, and the method 500 returns to step 504, where the unsupervised training application 120 sets the training point cloud 122 equal to at least a portion of a scene point cloud in unlabeled training collection 102.

If, however, at step 530, the unsupervised training application 120 determines that the training of the scene decomposition model 140 is complete, then method 500 proceeds directly to step 534. At step 534, the unsupervised training application 120 stores the scene decomposition model 140 as trained scene decomposition model 180 and optionally transmit any portions of the trained scene decomposition model 180 and/or any number of the learned variables to to any number and/or types of software applications. The method 500 then terminates.

In sum, the disclosed techniques can be used to train a scene decomposition model to decompose 3D scenes represented by point clouds into instances of a set of 3D geometric objects in order to generate structured and ordered representations of the 3D scenes. In some embodiments, an unsupervised training application executes an iterative unsupervised training process on an end-to-end model to generate a trained scene decomposition model. The end-to-end model includes, without limitation, a scene decomposition model and a generative model. The scene decomposition model is a permutation-invariant ML model that maps point clouds to sets of J quantized context features and sets of J spatial features describing J 3D geometric instances. For a given 3D geometric instance, a corresponding quantized context feature represents one of K learnable geometric objects and a corresponding spatial feature represents a position, orientation, and scale.

Within the end-to-end model, the quantized context features implicitly define variables of the scene decomposition model 140 such that the generative model enables computation of a log-likelihood for reconstruction of a point cloud based on the corresponding quantized context features and the corresponding spatial features. In some embodiments, the unsupervised training application repeatedly inputs scene point clouds from an unlabeled training collection into the end-to-end model to generate forward data. Periodically, the unsupervised training application modifies values for learnable variables in the scene decomposition model based on the forward data in order to minimize an overall loss function that includes a negative log-likelihood term. After training, the unsupervised training application stores the most recent version of the scene decomposition model as a trained scene decomposition model that includes, without limitation, any number and/or types of learned variables.

In some embodiments, the scene decomposition model includes, without limitation, a point cloud bottleneck, a quantization module, and a learnable codebook. The point cloud bottleneck maps N points in a scene point cloud to J spatial features and J context features. The quantization module maps each of the context features to the nearest of K learnable codes in a learnable codebook to generate K quantized context features.

In some embodiments, the point cloud bottleneck is based on a segmentation network. The segmentation network maps N points in a scene point cloud to N per-point features and maps the N per-point features to N soft-segmentations representing predicted probabilities between the points and J different clusters. Interpreting the J clusters as a mixture of J 3D Gaussians, the scene decomposition model computes J spatial features corresponding to the J 3D Gaussians based on the soft-segmentations. In a complementary fashion, the scene decomposition model computes J context features based on the per-point features and the soft-segmentations.

In some other embodiments, the point cloud bottleneck is based on a transformer decoder. A point cloud bottleneck maps N points in a scene point cloud to N keys and N values. Using J learnable queries in a learnable query set, the transformer decoder applies cross-attention with respect to the N keys and the N values to generate J output vectors. One or more neural networks decode the J output vectors to generate J context features and J spatial features.

At least one technical advantage of the disclosed techniques relative to the prior art is that the disclosed techniques enable point clouds that represent real-world 3D scenes to be processed effectively using ML models that, normally, are not able to operate on unstructured and/or unordered input data. In that regard, an ML model is trained to decompose a 3D scene, represented by a point cloud, into a set of 3D geometry blocks and associated spatial data that are specified via numerical features. Because a permutation-invariant neural network included in the ML model ingests points from the point cloud, the resulting trained ML model consistently maps different orderings of the same set of points to the same 3D geometry blocks and the same spatial data specified via the same numerical features in the same order. Consequently, an ML model trained using the disclosed techniques can map point clouds representing 3D scenes that include any number of objects in any poses to structured and ordered features that can be processed efficiently by a wide range of other ML models. These technical advantages provide one or more technological advancements over prior art approaches.

1. In some embodiments, a computer-implemented method for training a machine learning model to generate representations of point clouds comprises executing a first neural network on a first point cloud that represents a first three-dimensional (3D) scene to generate a key set and a value set; generating an output vector set based on a first query set, the key set, and the value set; computing a plurality of spatial features based on the output vector set; computing a plurality of quantized context features based on the output vector set and a first set of codes representing a first set of 3D geometry blocks; and modifying the first neural network based on a likelihood of reconstructing the first point cloud, the plurality of quantized context features, and the plurality of spatial features to generate an updated neural network, wherein a trained machine learning model includes the updated neural network, a second query set, and a second set of codes representing a second set of 3D geometry blocks and maps a point cloud representing a 3D scene to a representation of a plurality of 3D geometry instances.

2. The computer-implemented method of clause 1, wherein the output vector set is generated by executing a second neural network that includes a plurality of attention layers on the key set, the value set, and the first query set.

3. The computer-implemented method of clauses 1 or 2, wherein generating the output vector set comprises computing a first plurality of compatibility scores between the first query set and the key set; computing a first intermediate query set based on the value set and the first plurality of compatibility scores; and computing the output vector set based on the value set, the first intermediate query set, and the key set.

4. The computer-implemented method of any of clauses 1-3, further comprising generating the second query set based on at least one of the output vector set, the first query set, the key set, or the value set.

5. The computer-implemented method of any of clauses 1-4, wherein a first spatial feature included in the plurality of spatial features specifies at least one of a weight, a rotation matrix, a 3D scaling factor, or a translation.

6. The computer-implemented method of any of clauses 1-5, wherein a first quantized context feature included in the plurality of quantized context features is computed by computing a first context feature based on a first output vector included in the output vector set; computing a set of distances between the first context feature and the first set of codes; and setting the first quantized context feature equal to a first code included in the first set of codes based on the set of distances.

7. The computer-implemented method of any of clauses 1-6, wherein modifying the first neural network comprises replacing a first value for a first weight included in the first neural network with a second value for the first weight that increases a likelihood associated with reconstructing the first point cloud.

8. The computer-implemented method of any of clauses 1-7, further comprising executing one or more backpropagation operations on the first neural network to determine the second value for the first weight.

9. The computer-implemented method of any of clauses 1-8, further comprising executing the trained machine learning model on a second point cloud to generate a first representation of a first plurality of 3D geometry instances that includes at least one instance of a first 3D geometry block included in the second set of 3D geometry blocks and at least one instance of a second 3D geometry block included in the second set of 3D geometry blocks.

10. The computer-implemented method of any of clauses 1-9 wherein, for each 3D geometry instance included in the first plurality of 3D geometry instances, the first representation of the first plurality of 3D geometry instances includes a different quantized context feature and a different spatial feature.

11. In some embodiments, one or more non-transitory computer readable media include instructions that, when executed by one or more processors, cause the one or more processors to train a machine learning model to generate representations of point clouds by performing the steps of executing a first neural network on a first point cloud that represents a first three-dimensional (3D) scene to generate a key set and a value set; generating an output vector set based on a first query set, the key set, and the value set; computing a plurality of spatial features based on the output vector set; computing a plurality of quantized context features based on the output vector set and a first set of codes representing a first set of 3D geometry blocks; and modifying the first neural network based on a likelihood of reconstructing the first point cloud, the plurality of quantized context features, and the plurality of spatial features to generate an updated neural network, wherein a trained machine learning model includes the updated neural network, a second query set, and a second set of codes representing a second set of 3D geometry blocks and maps a point cloud representing a 3D scene to a representation of a plurality of 3D geometry instances.

12. The one or more non-transitory computer readable media of clause 11, wherein a second neural network executes a plurality of weighted averaging operations on the value set based on the key set and the first query set to generate the output vector set.

13. The one or more non-transitory computer readable media of clauses 11 or 12, wherein generating the output vector set comprises computing a first plurality of compatibility scores between the first query set and the key set; computing a first intermediate query set based on the value set and the first plurality of compatibility scores; and computing the output vector set based on the value set, the first intermediate query set, and the key set.

14. The one or more non-transitory computer readable media of any of clauses 11-13, further comprising generating the second query set based on at least one of the output vector set, the first query set, the key set, or the value set.

15. The one or more non-transitory computer readable media of any of clauses 11-14, wherein each spatial feature included in the plurality of spatial features specifies spatial information associated with a different cluster of points within the first point cloud.

16. The one or more non-transitory computer readable media of any of clauses 11-15, wherein a first quantized context feature included in the plurality of quantized context features is computed by computing a first context feature based on a first output vector included in the output vector set; computing a set of distances between the first context feature and the first set of codes; and setting the first quantized context feature equal to a first code included in the first set of codes based on the set of distances.

17. The one or more non-transitory computer readable media of any of clauses 11-16, further comprising computing a second code based on the first context feature; and replacing the first code included in the first set of codes with the second code to generate the second set of codes.

18. The one or more non-transitory computer readable media of any of clauses 11-17, wherein modifying the first neural network comprises replacing a first value for a first weight included in the first neural network with a second value for the first weight that increases a likelihood associated with reconstructing the first point cloud.

19. The one or more non-transitory computer readable media of any of clauses 11-18, wherein a first 3D geometry block included in the first set of 3D geometry blocks comprises at least a first portion of a first 3D object.

20. In some embodiments, a system comprises one or more memories storing instructions and one or more processors coupled to the one or more memories that, when executing the instructions, perform the steps of executing a first neural network on a first point cloud that represents a first three-dimensional (3D) scene to generate a key set and a value set; generating an output vector set based on a first query set, the key set, and the value set; computing a plurality of spatial features based on the output vector set; computing a plurality of quantized context features based on the output vector set and a first set of codes representing a first set of 3D geometry blocks; and modifying the first neural network based on a likelihood of reconstructing the first point cloud, the plurality of quantized context features, and the plurality of spatial features to generate an updated neural network, wherein a trained machine learning model includes the updated neural network, a second query set, and a second set of codes representing a second set of 3D geometry blocks and maps a point cloud representing a 3D scene to a representation of a plurality of 3D geometry instances.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for training a machine learning model to generate representations of point clouds, the method comprising:
    executing a first neural network on a first point cloud that represents a first three-dimensional (3D) scene to generate a key set and a value set;
    generating an output vector set based on a first query set, the key set, and the value set;
    computing a plurality of spatial features based on the output vector set;
    computing a plurality of quantized context features based on the output vector set and a first set of codes representing a first set of 3D geometry blocks; and
    modifying the first neural network based on a likelihood of reconstructing the first point cloud, the plurality of quantized context features, and the plurality of spatial features to generate an updated neural network,
    wherein a trained machine learning model includes the updated neural network, a second query set, and a second set of codes representing a second set of 3D geometry blocks and maps a point cloud representing a 3D scene to a representation of a plurality of 3D geometry instances.

2. The computer-implemented method of claim 1, wherein the output vector set is generated by executing a second neural network that includes a plurality of attention layers on the key set, the value set, and the first query set.

3. The computer-implemented method of claim 1, wherein generating the output vector set comprises:
    computing a first plurality of compatibility scores between the first query set and the key set;
    computing a first intermediate query set based on the value set and the first plurality of compatibility scores; and
    computing the output vector set based on the value set, the first intermediate query set, and the key set.

4. The computer-implemented method of claim 1, further comprising generating the second query set based on at least one of the output vector set, the first query set, the key set, or the value set.

5. The computer-implemented method of claim 1, wherein a first spatial feature included in the plurality of spatial features specifies at least one of a weight, a rotation matrix, a 3D scaling factor, or a translation.

6. The computer-implemented method of claim 1, wherein a first quantized context feature included in the plurality of quantized context features is computed by:
    computing a first context feature based on a first output vector included in the output vector set;
    computing a set of distances between the first context feature and the first set of codes; and
    setting the first quantized context feature equal to a first code included in the first set of codes based on the set of distances.

7. The computer-implemented method of claim 1, wherein modifying the first neural network comprises replacing a first value for a first weight included in the first neural network with a second value for the first weight that increases a likelihood associated with reconstructing the first point cloud.

8. The computer-implemented method of claim 7, further comprising executing one or more backpropagation operations on the first neural network to determine the second value for the first weight.

9. The computer-implemented method of claim 1, further comprising executing the trained machine learning model on a second point cloud to generate a first representation of a first plurality of 3D geometry instances that includes at least one instance of a first 3D geometry block included in the second set of 3D geometry blocks and at least one instance of a second 3D geometry block included in the second set of 3D geometry blocks.

10. The computer-implemented method of claim 9, wherein, for each 3D geometry instance included in the first plurality of 3D geometry instances, the first representation of the first plurality of 3D geometry instances includes a different quantized context feature and a different spatial feature.

11. One or more non-transitory computer readable media including instructions that, when executed by one or more processors, cause the one or more processors to train a machine learning model to generate representations of point clouds by performing the steps of:
    executing a first neural network on a first point cloud that represents a first three-dimensional (3D) scene to generate a key set and a value set;
    generating an output vector set based on a first query set, the key set, and the value set;
    computing a plurality of spatial features based on the output vector set;
    computing a plurality of quantized context features based on the output vector set and a first set of codes representing a first set of 3D geometry blocks; and
    modifying the first neural network based on a likelihood of reconstructing the first point cloud, the plurality of quantized context features, and the plurality of spatial features to generate an updated neural network,
    wherein a trained machine learning model includes the updated neural network, a second query set, and a second set of codes representing a second set of 3D geometry blocks and maps a point cloud representing a 3D scene to a representation of a plurality of 3D geometry instances.

12. The one or more non-transitory computer readable media of claim 11, wherein a second neural network executes a plurality of weighted averaging operations on the value set based on the key set and the first query set to generate the output vector set.

13. The one or more non-transitory computer readable media of claim 11, wherein generating the output vector set comprises:
    computing a first plurality of compatibility scores between the first query set and the key set;
    computing a first intermediate query set based on the value set and the first plurality of compatibility scores; and
    computing the output vector set based on the value set, the first intermediate query set, and the key set.

14. The one or more non-transitory computer readable media of claim 11, further comprising generating the second query set based on at least one of the output vector set, the first query set, the key set, or the value set.

15. The one or more non-transitory computer readable media of claim 11, wherein each spatial feature included in the plurality of spatial features specifies spatial information associated with a different cluster of points within the first point cloud.

16. The one or more non-transitory computer readable media of claim 11, wherein a first quantized context feature included in the plurality of quantized context features is computed by:
- computing a first context feature based on a first output vector included in the output vector set;
- computing a set of distances between the first context feature and the first set of codes; and
- setting the first quantized context feature equal to a first code included in the first set of codes based on the set of distances.

17. The one or more non-transitory computer readable media of claim 16, further comprising:
- computing a second code based on the first context feature; and
- replacing the first code included in the first set of codes with the second code to generate the second set of codes.

18. The one or more non-transitory computer readable media of claim 11, wherein modifying the first neural network comprises replacing a first value for a first weight included in the first neural network with a second value for the first weight that increases a likelihood associated with reconstructing the first point cloud.

19. The one or more non-transitory computer readable media of claim 11, wherein a first 3D geometry block included in the first set of 3D geometry blocks comprises at least a first portion of a first 3D object.

20. A system comprising:
one or more memories storing instructions; and
one or more processors coupled to the one or more memories that, when executing the instructions, perform the steps of:
- executing a first neural network on a first point cloud that represents a first three-dimensional (3D) scene to generate a key set and a value set;
- generating an output vector set based on a first query set, the key set, and the value set;
- computing a plurality of spatial features based on the output vector set;
- computing a plurality of quantized context features based on the output vector set and a first set of codes representing a first set of 3D geometry blocks; and
- modifying the first neural network based on a likelihood of reconstructing the first point cloud, the plurality of quantized context features, and the plurality of spatial features to generate an updated neural network,
wherein a trained machine learning model includes the updated neural network, a second query set, and a second set of codes representing a second set of 3D geometry blocks and maps a point cloud representing a 3D scene to a representation of a plurality of 3D geometry instances.

* * * * *